(12) United States Patent
Telbizov et al.

(10) Patent No.: US 12,335,351 B1
(45) Date of Patent: Jun. 17, 2025

(54) EDGE NETWORKS FOR SURROGATE BROWSING AND DIRECT TRAFFIC VIA PROXY

(71) Applicant: Menlo Security, Inc., Mountain View, CA (US)

(72) Inventors: Rumen Nikolov Telbizov, Burnaby (CA); Matthew Gordon Mercer, Rossland (CA); Christopher Turra, Port Coquitlam (CA); Omid Ehtemam-Haghighi, North Saanich (CA); Hugo Marius Slabbert, Mission (CA)

(73) Assignee: Menlo Security, Inc., Mountain View, CA (US)

( * ) Notice: Subject to any disclaimer, the term of this patent is extended or adjusted under 35 U.S.C. 154(b) by 0 days.

(21) Appl. No.: 18/968,906

(22) Filed: Dec. 4, 2024

Related U.S. Application Data

(60) Provisional application No. 63/626,318, filed on Jan. 29, 2024, provisional application No. 63/606,540, filed on Dec. 5, 2023.

(51) Int. Cl.
*H04L 67/56* (2022.01)
*H04L 12/46* (2006.01)
*H04L 45/302* (2022.01)

(52) U.S. Cl.
CPC .......... *H04L 67/56* (2022.05); *H04L 12/4633* (2013.01); *H04L 45/306* (2013.01)

(58) Field of Classification Search
CPC ............................ H04L 67/56; H04L 12/4633
See application file for complete search history.

(56) References Cited

U.S. PATENT DOCUMENTS

| | | | | |
|---|---|---|---|---|
| 9,391,832 B1* | 7/2016 | Song | ................... | G06F 12/1408 |
| 10,868,881 B1* | 12/2020 | Chang | ................... | H04L 67/59 |
| 11,245,731 B1* | 2/2022 | Guruswamy | ............ | H04L 67/06 |
| 11,611,482 B1* | 3/2023 | Litty | ................... | H04L 47/22 |
| 2005/0286553 A1* | 12/2005 | Wetterwald | ............ | H04L 69/167 370/466 |
| 2007/0189329 A1* | 8/2007 | Latvala | ................. | H04L 61/106 370/466 |
| 2010/0211780 A1* | 8/2010 | Mukkara | ............. | H04L 63/1466 713/168 |
| 2013/0223445 A1* | 8/2013 | Palani | ................... | H04L 61/251 370/392 |
| 2013/0227165 A1* | 8/2013 | Liu | ....................... | H04L 69/161 709/238 |
| 2015/0067027 A1* | 3/2015 | Liu | ...................... | H04L 67/1027 709/227 |
| 2016/0202673 A1* | 7/2016 | Ehtemam-Haghighi | .................... | G06F 1/3287 700/275 |

(Continued)

*Primary Examiner* — Hieu T Hoang
(74) *Attorney, Agent, or Firm* — AMSEL IP LAW PLLC; Jason Amsel

(57) ABSTRACT

Edge networks for surrogate browsing and direct traffic via proxy are disclosed. A first server processes a received first IPv4 packet into an encapsulation. The encapsulation is sent to a second server. The second server determines a third server to which the encapsulation should be routed and transmits it. The third server processes the encapsulation, selects a public IP address, and transmits a second IPv4 packet using the selected public IP address as a source address of the second IPv4 packet.

21 Claims, 32 Drawing Sheets

(56) References Cited

U.S. PATENT DOCUMENTS

| | | | |
|---|---|---|---|
| 2020/0007585 A1* | 1/2020 | Williams | H04L 63/12 |
| 2021/0168132 A1* | 6/2021 | Smith | H04L 67/12 |
| 2021/0234901 A1* | 7/2021 | Thomas | H04L 63/20 |
| 2022/0210072 A1* | 6/2022 | Dutta | H04L 47/125 |
| 2023/0261984 A1* | 8/2023 | Dunbar | H04L 45/74 |
| | | | 370/328 |
| 2023/0275830 A1* | 8/2023 | Chen | H04L 61/2514 |

\* cited by examiner

FIG. 10

MenloSecurity

- Dashboard
- Logs
- Insights
- Web Policy
- DLP Policy
- Reporting
- Settings
- Customization
- Help

DLP Rules | Dictionary Groups | Dictionaries | DLP Auditors

Data Loss Prevention Rules (Drag and drop to re-order)

[Search] [Clear]   [+ Add New Rule]

1-4 of 4 rules
0 of 4 DLP Rules selected

| Name | Description | Users/Groups | Dictionaries | Action | | |
|---|---|---|---|---|---|---|
| ☐ Another PII DLP Rule | | All | Driver's licenses [USA], Bank account details with personally identifiable information [USA], Credit or debit card numbers near personally identifiable information [USA] + 2 more | ⊖ Block | Delete | Edit |
| ☐ Job Applications | Stop uploads of employee CVs | All | Curriculum Vitae [UK], Curriculum Vitae [USA], Curriculum Vitae [Canada] | ⊖ Block | Delete | Edit |
| ☐ PII | Block upload of personally identifiable inform... | All | Postal addresses [UK], Bank account details near contact details [UK], combination of personally identifiable information [UK] + 16 more | ⊖ Block | Delete | Edit |
| ☐ Financial Data | | All | International Bank Account Numbers [Global], Credit card numbers - with phrases [Global], Credit card numbers [Global] + 65 more | ⊖ Block | Delete | Edit |

| Edit DLP Rule | | |
|---|---|---|
| DLP Rule | RULE DETAILS | |
| Content Types | Rule Name | Block CreditCard Uploads |
| Criteria | Description | Enter Description |
| Action | User Notification (Displayed on block pages) | You have attempted to submit protected corporate content to an Internet WWW site that is not approved by corporate policy! |
| Dictionaries / Groups | | |

Cancel  < Back  Next >  Save

FIG. 11

| Edit DLP Rule | |
|---|---|
| DLP Rule | |
| Content Types | USER INPUT INSPECTION |
| Criteria | User input will be passed through DLP inspection when network submissions are requested. If DLP inspection generates a policy block, the tab is blocked from network access and the user is notified. |
| Action | (•) Inspect Text Inputs |
| Dictionaries / Groups | FILE UPLOAD INSPECTION |
| | Files being uploaded will be passed through DLP inspection. If DLP inspection generates a policy block, the upload is blocked and the user is notified. |
| | Maximum File Size [50] [MB ˅] |
| | (•) Inspect All File Types |

Cancel [< Back] [Next >] [Save]

FIG. 12

Edit DLP Rule

| DLP Rule |
|---|
| Content Types |
| Criteria |
| Action |
| Dictionaries / Groups |

USERS AND GROUPS

◉ All Users

List of Users    Enter users(s)

List of Groups    [finance dept ×] [marketing dept ×]
          Enter groups(s)

DOMAINS

Domains (optional)    dropbox.com dlptest.com box.com

CATEGORIES

Categories (optional)    Add Categories

[Cancel] [< Back] [Next >] [Save]

FIG. 13

Edit DLP Auditor Profile

AUDITOR DETAILS

Auditor Name    DLPAdmins

Description     DLP Admin Auditors team

AUDITORS AND FILE DETAILS

Email Addresses    bob@example.com  charlie@example.com

Enter Email Address(es)

Send File          ◯

File Format        Encrypted ZIP File

Encrypted ZIP Password    Generate Password

Cancel  Save

FIG. 14

| Edit DLP Rule | |
|---|---|
| DLP Rule | |
| Content Types | ACTION |
| Criteria | Action ⊙ Block ▽ |
| Action | Send Audit Email ◯ |
| Dictionaries / Groups | Select Auditors [ DLPAdmins ×  Add Auditors ] |

[Cancel] [<Back] [Next>] [Save]

FIG. 15

Edit DLP Rule 1600

| DLP Rule | | | | |
|---|---|---|---|---|
| Content Types | | | | |
| Criteria | | | | |
| Action | | | | |
| Dictionaries / Groups | | | | |

DLP GROUPS / DICTIONARIES

Credit | All Types ∨ | All Categories ∨ | All Regions ∨ | Clear 13 items selected — 1-10 of 23

| Name △ | Type | Category | Region |
|---|---|---|---|
| Credit card magnetic track 1 [Global] | Predefined Dictionary | Financial Data, PCI DSS | Global |
| Credit card magnetic track 2 [Global] | Predefined Dictionary | Financial Data, PCI DSS | Global |
| Credit card number - with phrases [Global] | Predefined Dictionary | Personally Identifiable Information, Financial Data, PCI DSS | Global |
| Credit card numbers [Global] | Predefined Dictionary | Personally Identifiable Information, Financial Data, PCI DSS | Global |
| Credit or debit card numbers near personally identifi... | Predefined Dictionary | Personally Identifiable Information, Financial Data, PCI DSS | Belgium |
| Credit or debit card numbers near personally identifi... | Predefined Dictionary | Personally Identifiable Information, Financial Data, PCI DSS | Finland |
| Credit or debit card numbers near personally identifi... | Predefined Dictionary | Personally Identifiable Information, Financial Data, PCI DSS | Hong Kong |
| Credit or debit card numbers near personally identifi... | Predefined Dictionary | Personally Identifiable Information, Financial Data, PCI DSS | India |
| Credit or debit card numbers near personally identifi... | Predefined Dictionary | Personally Identifiable Information, Financial Data, PCI DSS | Singapore |

Cancel | < Back | Next > | Save

FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  |   Opt1 Type   | Opt1 Data Len |
+-+-+-+-+-+-+-+-+-+-+-+-+-+-+-+-+-+-+-+-+-+-+-+-+-+-+-+-+-+-+-+-+
|                           Opt1 Data                           |
+-+-+-+-+-+-+-+-+-+-+-+-+-+-+-+-+-+-+-+-+-+-+-+-+-+-+-+-+-+-+-+-+
```

FIG. 26J

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Opt1 Type   | Opt1 Data Len |    Opt1 Data (Policy ID)      |
+-+-+-+-+-+-+-+-+-+-+-+-+-+-+-+-+-+-+-+-+-+-+-+-+-+-+-+-+-+-+-+-+
|   Opt2 Type   |   Opt2 Len    |Opt2 Data (Con.|    Padding    |
+-+-+-+-+-+-+-+-+-+-+-+-+-+-+-+-+-+-+-+-+-+-+-+-+-+-+-+-+-+-+-+-+
```

FIG. 26K

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  |   Opt1 Type   | Opt1 Data Len |
+-+-+-+-+-+-+-+-+-+-+-+-+-+-+-+-+-+-+-+-+-+-+-+-+-+-+-+-+-+-+-+-+
|     Opt1 Data (Policy ID)     |   Opt2 Type   |   Opt2 Len    |
+-+-+-+-+-+-+-+-+-+-+-+-+-+-+-+-+-+-+-+-+-+-+-+-+-+-+-+-+-+-+-+-+
|Opt2 Data (Con.|                                               |
+-+-+-+-+-+-+-+-+                                               +
|                             Pad                               |
+-+-+-+-+-+-+-+-+-+-+-+-+-+-+-+-+-+-+-+-+-+-+-+-+-+-+-+-+-+-+-+-+
```

FIG. 26L

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Opt1 Type   |      Opt1 Data (Policy + Consistency ID)      |
+-+-+-+-+-+-+-+-+-+-+-+-+-+-+-+-+-+-+-+-+-+-+-+-+-+-+-+-+-+-+-+-+
```

FIG. 26M

EDGE NETWORKS FOR SURROGATE BROWSING AND DIRECT TRAFFIC VIA PROXY

CROSS REFERENCE TO OTHER APPLICATIONS

This application claims priority to U.S. Provisional Patent Application No. 63/606,540 entitled RECAST EDGE filed Dec. 5, 2023, and also claims priority to U.S. Provisional Patent Application No. 63/626,318 entitled RECAST EDGE filed Jan. 29, 2024, both of which applications are incorporated herein by reference for all purposes.

BACKGROUND OF THE INVENTION

One way that nefarious individuals perpetrate computer attacks is by exploiting browser vulnerabilities. When an unsuspecting user visits a website hosting malicious content, that user's browser can be compromised. The compromise can potentially be further extended to other resources on the user's computer and/or other systems. One approach to helping protect users of browsers is to make use of a surrogate browser, interposed between the user's browser and remote content. In an example implementation, the surrogate browser can be used to interact with potentially problematic content, and an end user can be presented with a representation of those interactions while protecting the user's own browser from at least some potential harm. One potential problem with such an approach can occur where the surrogate browser is located on a network that is different from the user's network. As one example, if a user is located in Ohio, but the surrogate browser is located on a network in Paris, the user's experience may be less satisfying than when the user's own browser is directly used to access content (e.g., a "restaurants near me" search returning results in France instead of the United States). Accordingly, improvements in surrogate browsing techniques, including those that improve user experience, are desirable.

BRIEF DESCRIPTION OF THE DRAWINGS

Various embodiments of the invention are disclosed in the following detailed description and the accompanying drawings.

FIG. 10 illustrates an example of an interface.

FIG. 11 illustrates an example of an interface.
FIG. 12 illustrates an example of an interface.
FIG. 13 illustrates an example of an interface.
FIG. 14 illustrates an example of an interface.
FIG. 15 illustrates an example of an interface.
FIG. 16 illustrates an example of an interface.
FIG. 26J illustrates an IPV6 Hop-by-hop Extension Header structure
FIG. 26K illustrates an encoding scheme.
FIG. 26L illustrates an encoding scheme.
FIG. 26M illustrates an encoding scheme.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. EXAMPLE ENVIRONMENT

Figure 1:
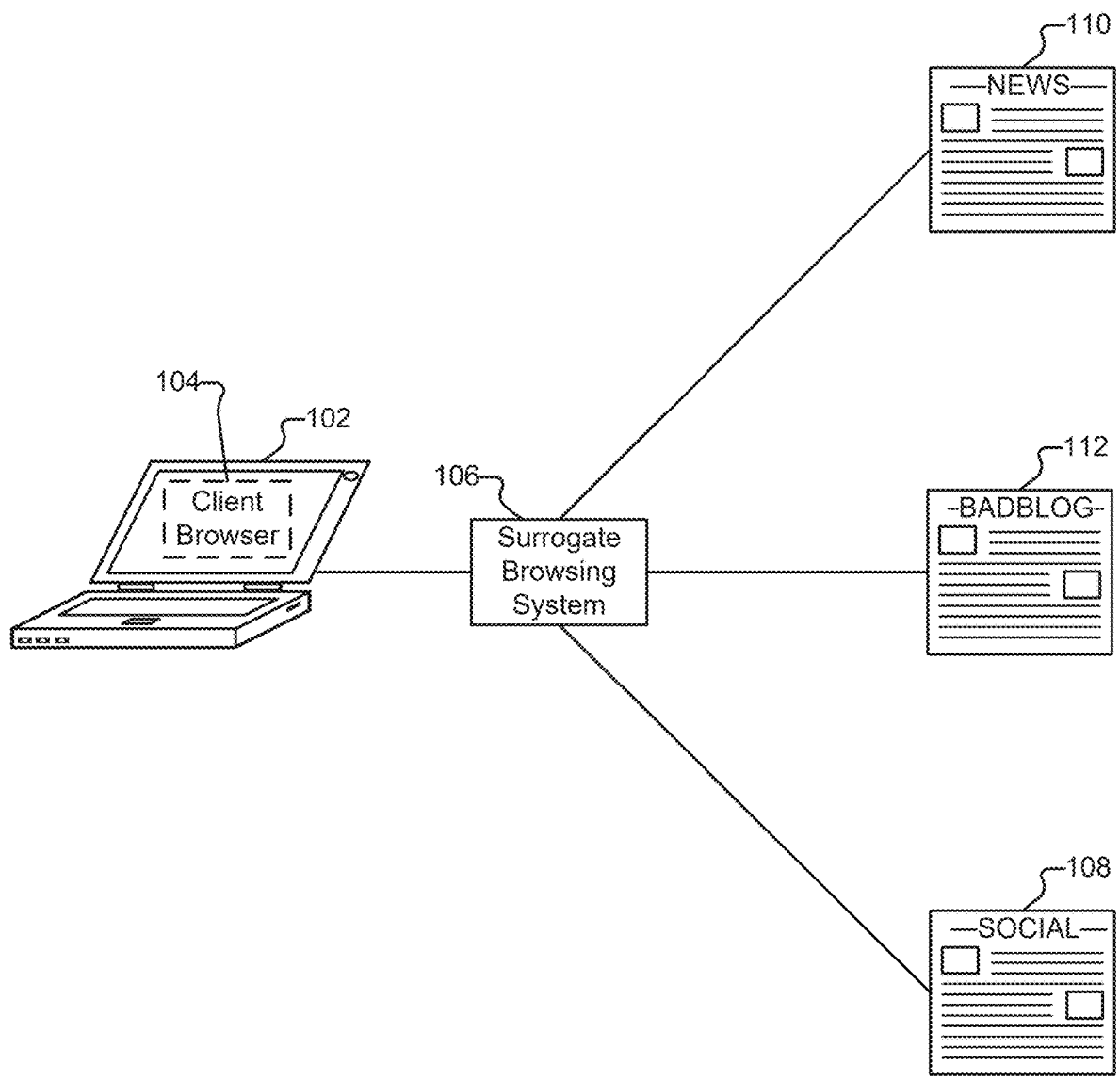
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links-resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed-located at data centers around the world.

Figure 2A:
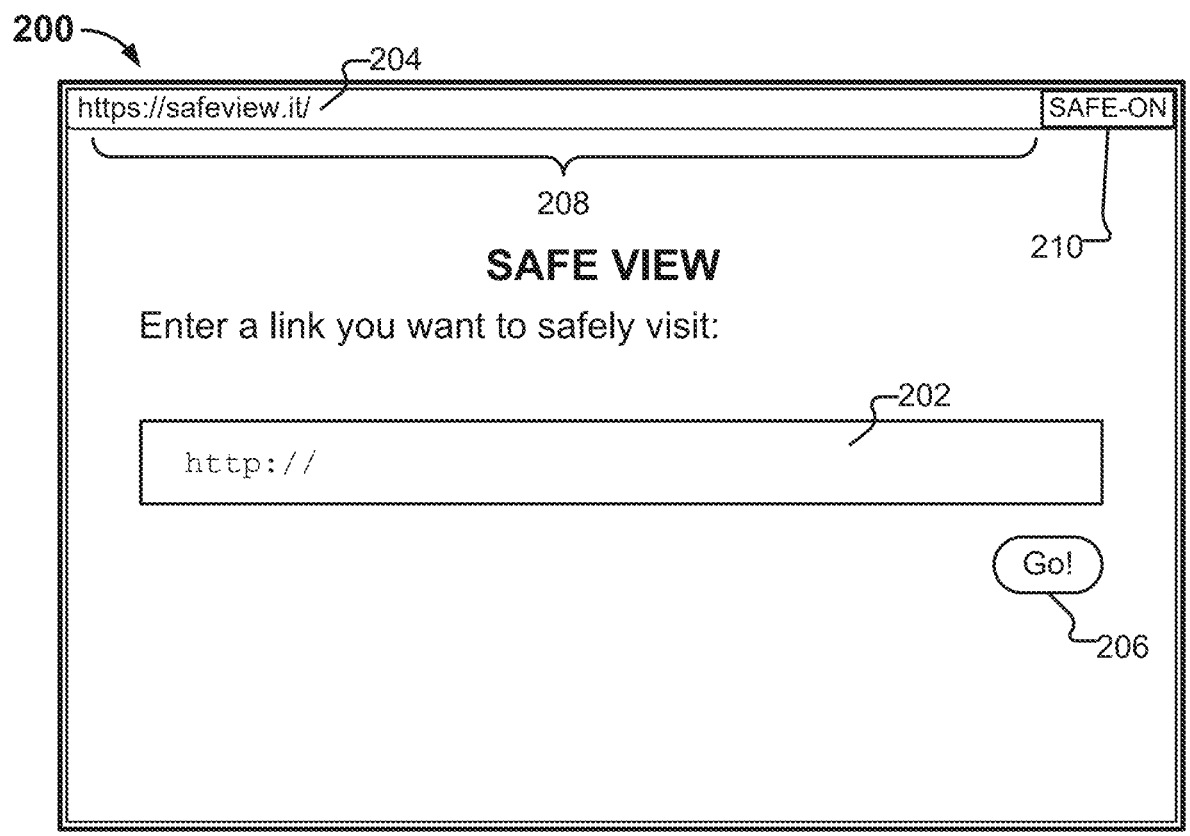
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://example-news.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
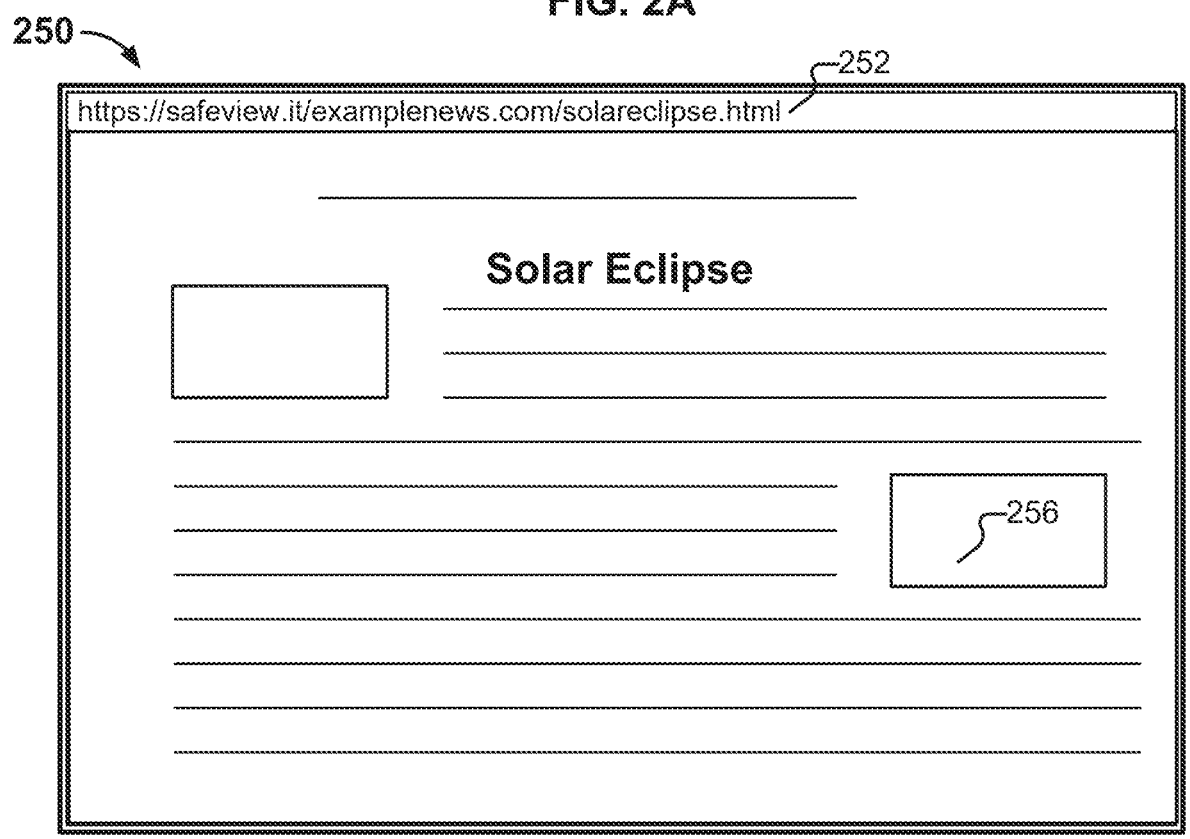
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "examplenews.com/solareclipse.html" directly with her browser. As will be described in more detail below, system 106 has fetched the content from site 110 on behalf of Alice, and has processed the received content to generate a representation of the content that is then provided by system 106 to client 102. Also, as will be described in more detail below, surrogate browsing system 106 can be configured in a variety of ways and use a variety of techniques to transform the content it receives (e.g., from site 110) prior to transmitting a representation of the content to client 102.

Figure 3:
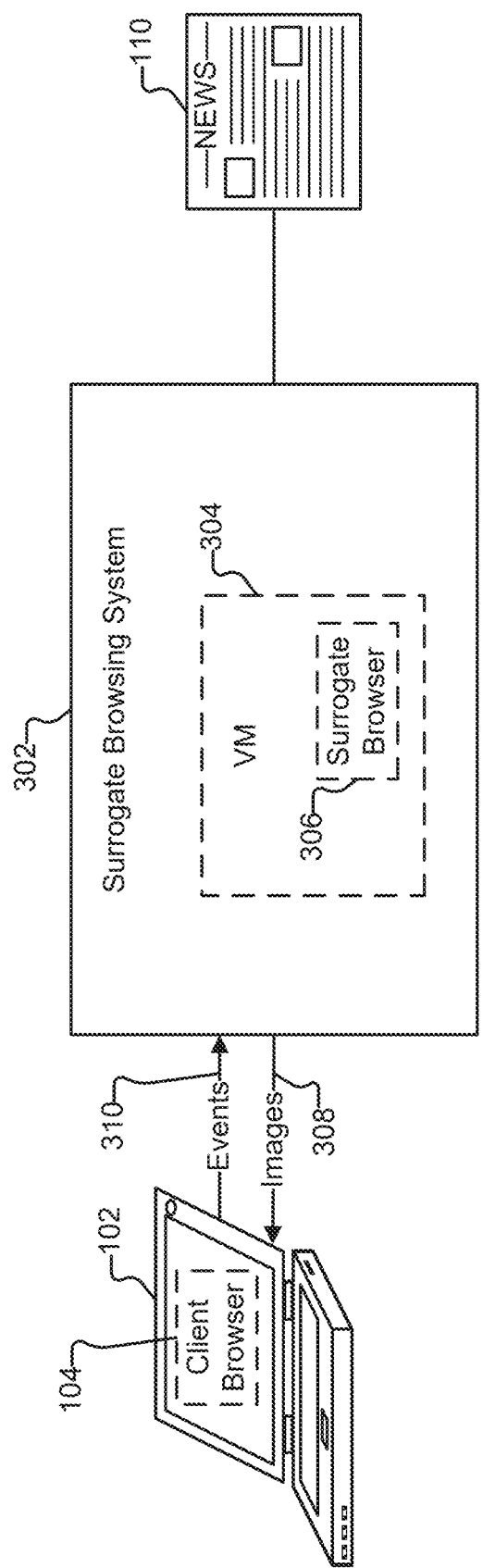
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components-a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
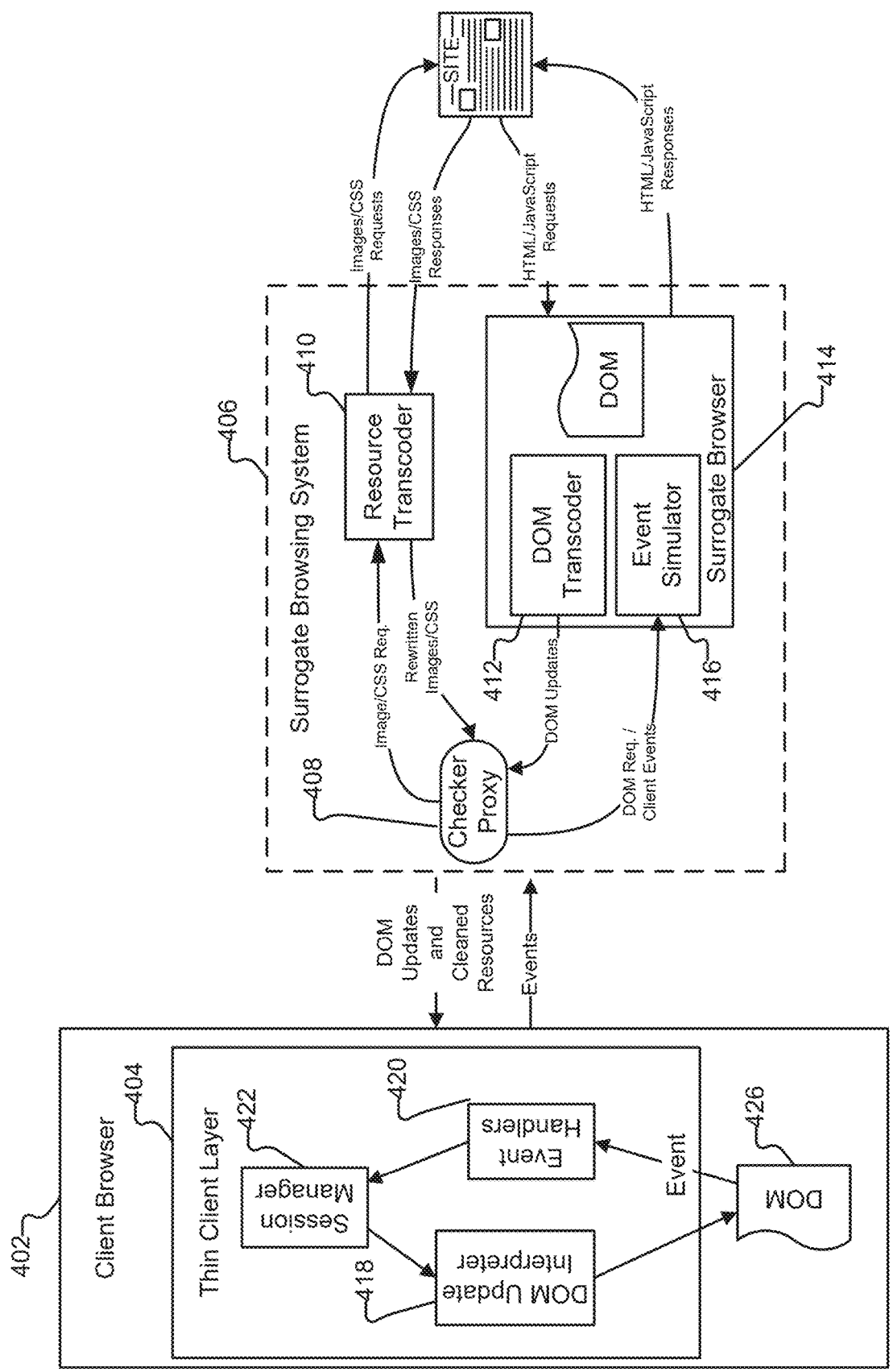
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

A. Surrogate Browsing System 406

1. Surrogate Browser 414

Surrogate browser 414 is a Webkit-based browser (or other appropriate browser) running inside a Linux container-a lightweight and disposable sandboxing environment. The surrogate browser renders requested pages and runs JavaScript code within the pages. It also contains an event simulator component 416 that applies user interaction events (e.g., 310) received from client 102.

2. DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interactions and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

3. Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

4. Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker proxy 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker proxy 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

B. Thin Client Layer 404

The thin client layer (404) includes three logical components: a DOM update interpreter 418, client event input handler(s) 420, and a session manager 422.

1. DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

2. Event Handler(s) 420

Many modern web pages are interactive-user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

3. Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages-a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

C. Enterprise Mode

Figure 5:
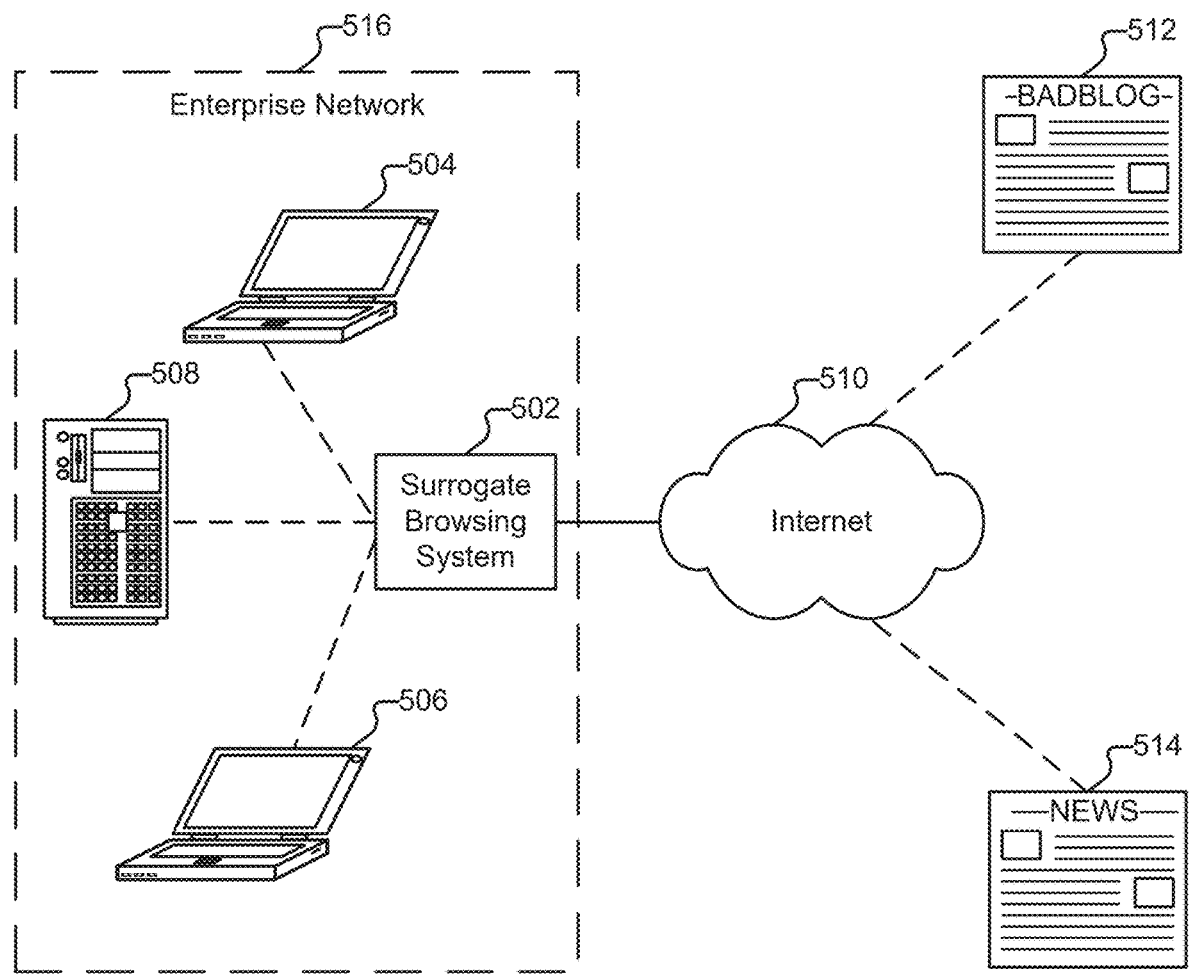
FIG. 5 illustrates an embodiment of a surrogate browsing system.

FIG. 5 illustrates an embodiment of a surrogate browsing system. In the example shown, an enterprise (e.g., the company for which a user, "Charlie," works) has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512, must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

D. Additional Information-Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to a video player provided by surrogate browsing system 702, such as by using the <video> tag.

E. Additional Information-Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification.
Unique_id and frame_id are attributes that maintain
the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

TABLE 2

Example of DOM update sequence. A div element is added to the DOM.

DOM_add_element, "div," [["id," "example"], ["class," "mainCSS"]], "123121," "245564576," "12353123," "13443253456"
DOM_modify_attribute, "123121," "id," "changed," "13443253456"
DOM_remove_element, "123121," "13443253456"

Then, its id attribute is changed. Finally, the element is removed from the DOM.

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

TABLE 3

Example of unsuccessful attacks. In case a), the checker will not
recognize a new command and classify it as a malicious activity.
In case b), the checker will, using whitelists, observe that the
attacker is trying to inject a script and classify it as an attack.

a) DOM_inject_script, "javascript:do_bad_things( )"
b) DOM_add_element, "script," [["type," "JavaScript"]], "123121," "245564576," "12353123," "13443253456"

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

F. Example Process Used In Some Embodiments

Figure 6:
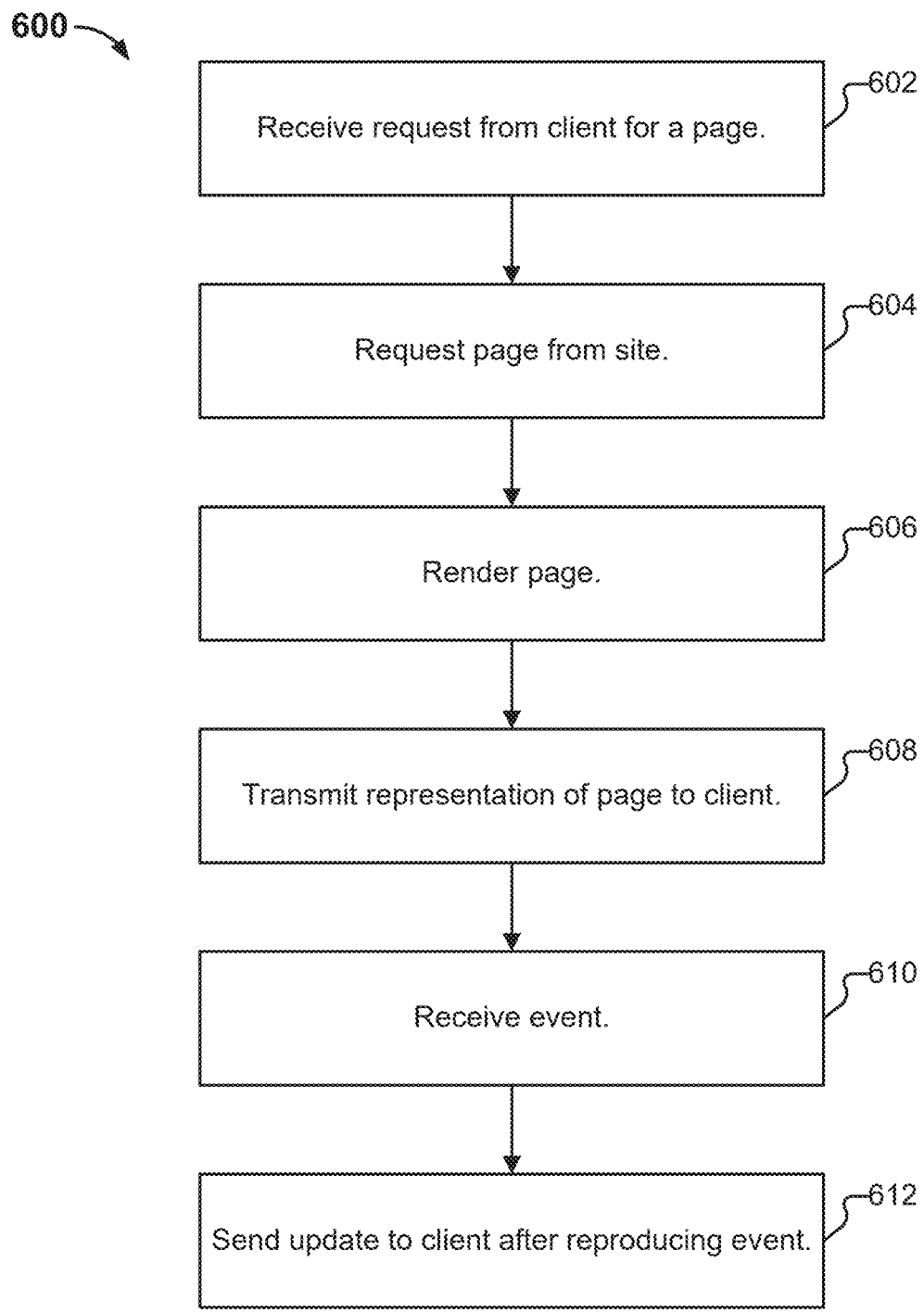
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also, as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612-either as an updated image (e.g., in the case of system 302) or as a DOM layout update (e.g., in the case of system 406).

G. Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. ADDITIONAL EXAMPLE ENVIRONMENT

Figure 7:
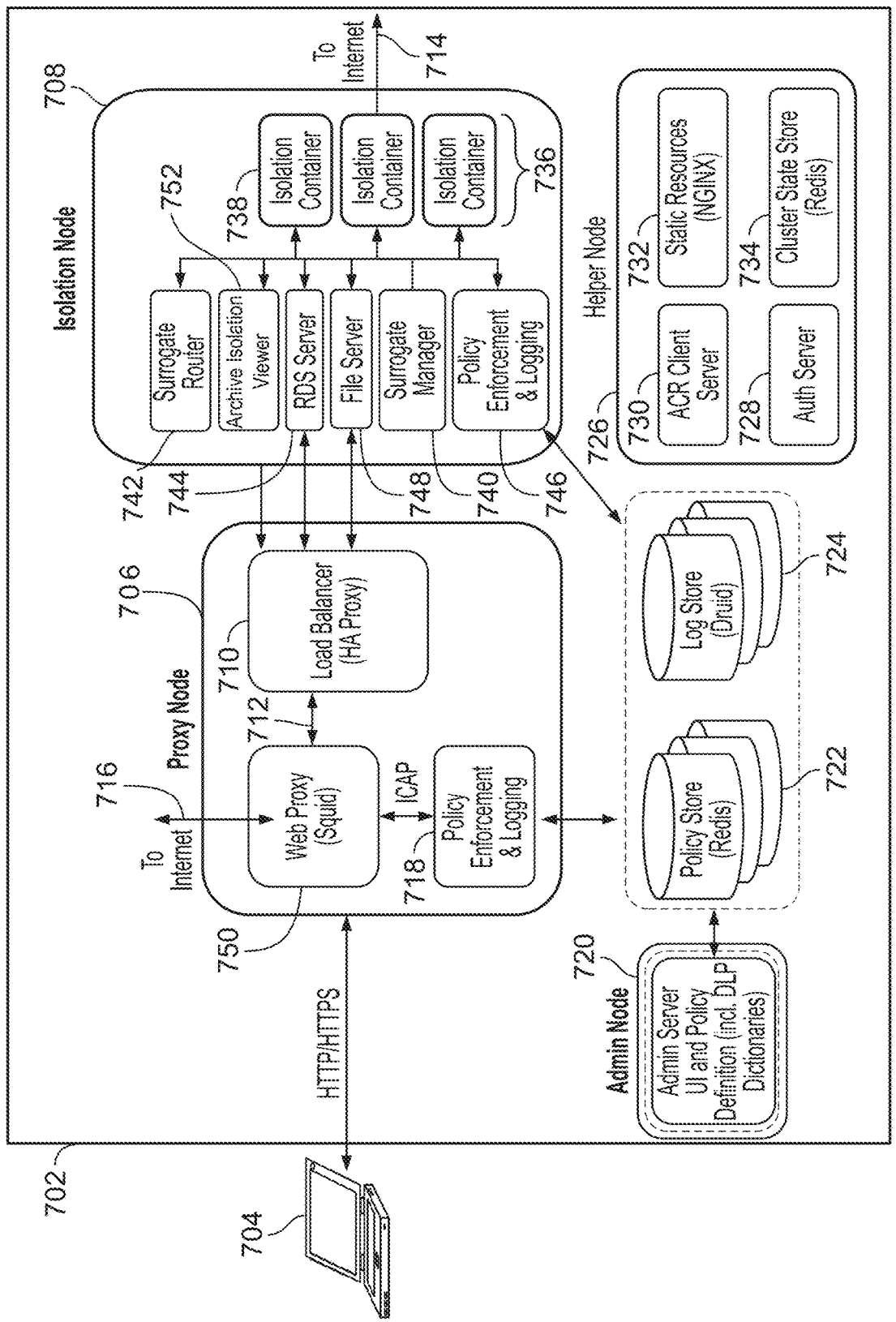
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g., each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes is configured in a separate AWS Auto Scale group to provide per-cluster elasticity as demand increases and decreases.

Proxy node 706 acts as a gateway to surrogate browsing system 702. Users of surrogate browsing system 702 (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable, proxy node 706 can be configured to provide data loss (or leak) prevention (DLP) services to traffic associated with client 704. This can be helpful, e.g., where client 704's traffic exits to the Internet via path 716, rather than through isolation node 708. As will be described in more detail below, more robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, ACR client server 730 provides a copy of a thin client (stored as a static resource along with other static resources 732 such as company logos, boilerplate text, etc.) to the client browser. Finally, cluster state store 734 is responsible for maintaining/synchronizing external state (e.g., which isolation container 736 is currently assigned to a client).

Although pictured in FIG. 7 as having an isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium browser process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. PAIRING AND COMMUNICATION CHANNELS

Figure 8:
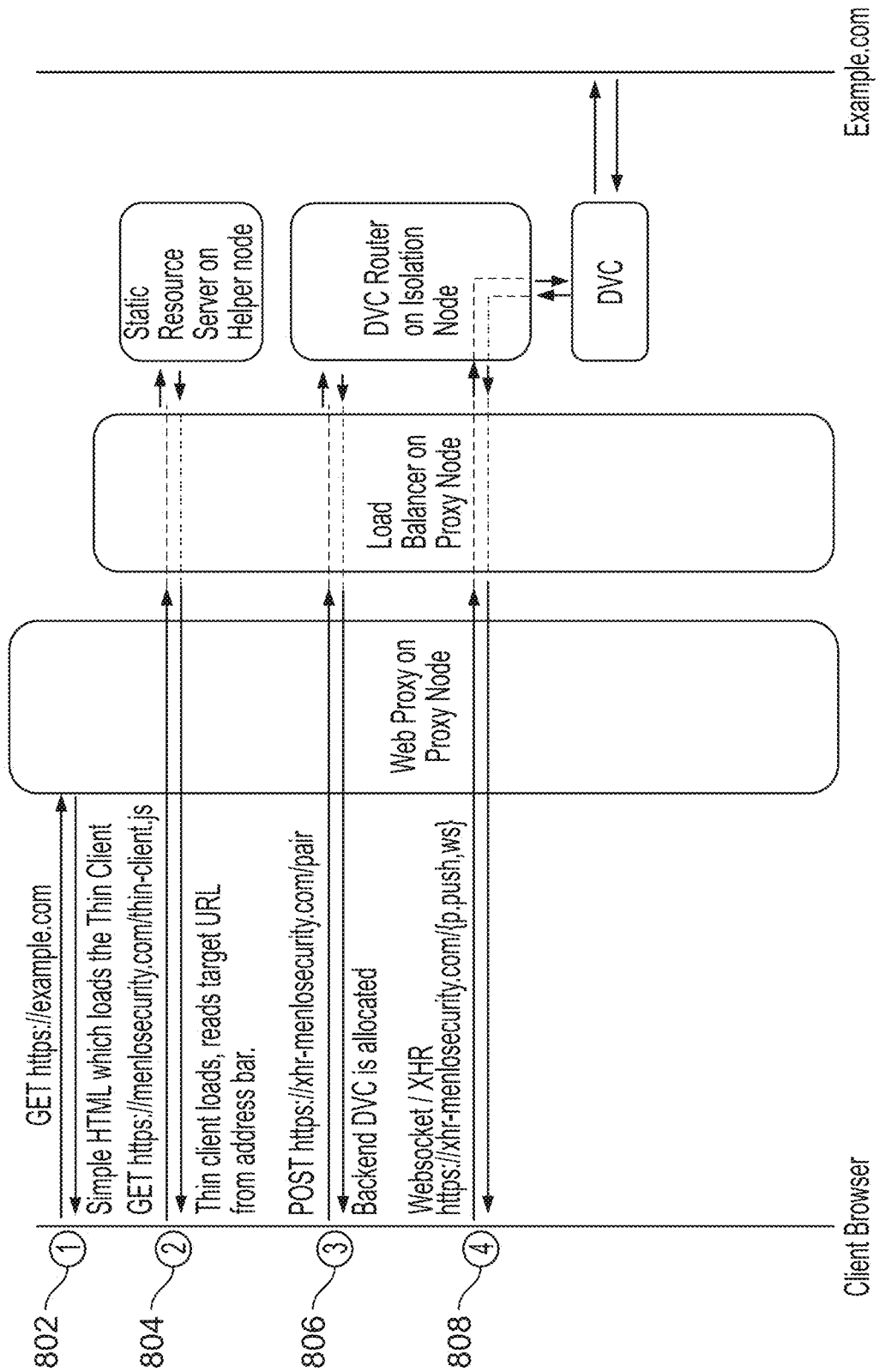
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client." This JavaScript is loaded from helper node 726. It is the same for all visited pages and will be cached by the client browser after the first visit to any site.

Third (806), the thin client JavaScript starts executing in the client browser. The thin client consults the address bar to get the URL of the page the user wants to load and POSTs it to xhr-menlosecurity.com/pair. At this point, a Disposable Virtual Container (DVC), also referred to herein as an isolation container, is allocated for the user, if necessary. The DVC for the user is then instructed to create a tab and navigate it to example.com. The DVC starts loading example.com. At this point, no information from example-.com has been sent to the client browser.

Finally (808), a communication channel with the DVC is established and information starts flowing bidirectionally to the client: rendering data flows from the DVC and user input (mouse, keyboard) flows to the DVC. This communication occurs over a websocket if a websocket can be established. Otherwise, communication occurs via multiple XHR requests.

Figure 9:
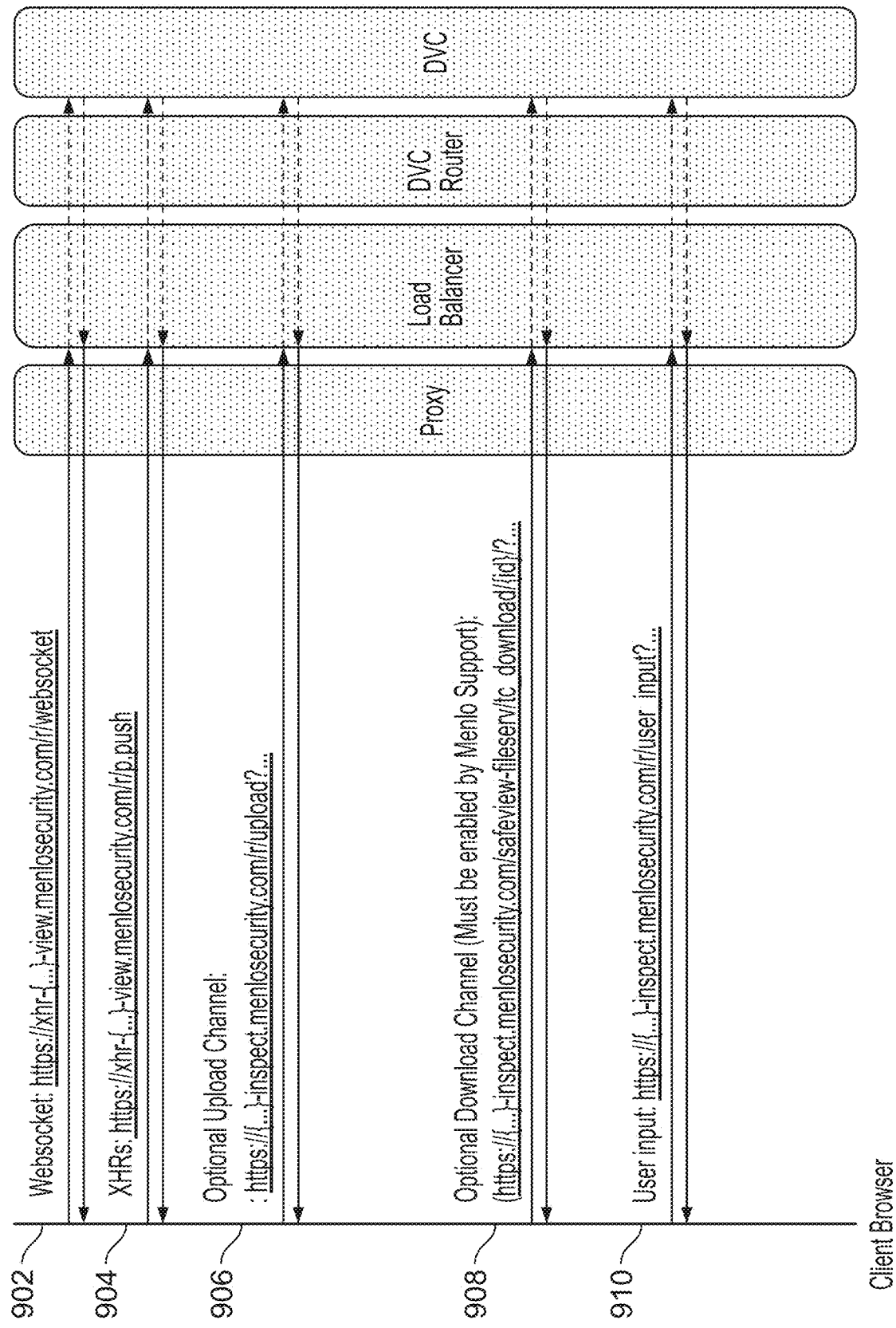
FIG. 9 illustrates different communication channels used in various embodiments.

FIG. 9 illustrates different communication channels used in various embodiments. Channel 902 is used to relay user input (mouse, keyboard) to the DVC. Channel 904 is used to relay rendering information to the client browser. As mentioned above, if possible, a websocket is used. Otherwise, XHRs are used. Channel 906 is a dedicated channel for uploads. The original destination URL (example.com) is a URL parameter (page_url). Channel 908 is a dedicated channel for downloads. The original source of the file (example.com/file.bin) is a URL parameter (file_url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. HANDLING ENCRYPTED FILES

In the following discussion, suppose that Alice, an employee of ACME Bank, is using surrogate browsing system 702 at work, and that ACME Bank would like to prevent (e.g., via DLP) sensitive financial and other information from being exfiltrated from the bank (e.g., via bank computers). As a specific example, suppose ACME Bank would like to prevent credit card information from being exfiltrated (e.g., in files uploaded by users).

A. Configuring DLP

Figure 17:
FIG. 17 illustrates an example of an interface.

In order to configure a new DLP rule for credit cards, an ACME Bank administrator first accesses a tenant administration portal served by administration node 720. An example of that interface is shown in FIG. 10. The administrator clicks on "Add New Rule" and is presented with the interface shown in FIG. 11. The administrator names the rule and specifies an end-user notification message to display. Next, the administrator specifies that the rule applies to file uploads, as shown in FIG. 12. The administrator then specifies which users/groups of users should be subject to the rule, and for which sites the rule applies, as shown in FIG. 13. As shown in FIG. 14, the administrator can create a DLP auditor profile for alerting (e.g., via email) when the rule is violated, and specify contact information for those auditors. If desired, the auditors can receive a copy of the problematic file by selecting the appropriate option in the interface. The administrator can then attach the DLP auditor profile to the DLP rule and specify what action to take upon a rule violation, such as block, allow and log/alert, etc. (as shown in FIG. 15). The administrator next specifies which dictionaries should be used to look for rule violations (e.g., text containing credit card numbers in this example) as shown in FIG. 16. The dictionaries made available in interface 1600 can comprise both custom dictionaries (e.g., of words/phrases unique to ACME such as internal product names, internal IP addresses, etc.) and more generally applicable dictionaries (e.g., made available as part of a subscription service provided by system 702 and/or a third party, as applicable). Examples of dictionaries include compliance rules, rules pertaining to particular verticals (e.g., healthcare vs. finance), regionally applicable privacy rules, etc. Finally, the administrator saves the rule (the result of which is shown in FIG. 17). The finished rule is published by the administration node to other nodes as applicable (e.g., proxy node 706 and isolation node 708).

B. Triggering DLP

Suppose Alice creates a Microsoft Word document that contains a list of credit card numbers. She protects the document via a password, which encrypts the document using the ECMA-376 standard, rendering its content unreadable at the network/proxy level (e.g., to a typical proxy, firewall, or other network device). Other document types and encryption schemes can also be used in accordance with techniques described herein. After saving the document, Alice attempts to exfiltrate it by visiting a website to which it can be uploaded. In this example, the website is a DLP test website (dlptest.com). Other examples of sites that she could use include box.com, dropbox.com, onedrive.com, etc.

Figure 18:
FIG. 18 illustrates an example of an interface.

When Alice uses client 704 to access dlptest.com with her browser (via surrogate browsing system 702), the site is automatically isolated (e.g., in isolation container 738). An example of the upload interface of dlptest.com is shown in FIG. 18. When Alice clicks on region 1802, or drags the Word document to region 1802, surrogate browsing system 702 will identify that dlptest.com is requesting a file upload. It communicates (via the thin client) with her browser to initiate the file upload to isolation container 738 (via a standard POST). At this point, no portion of the file has been transmitted to dlptest.com. This prevents any complex/obfuscated protocols (e.g., employed by the remote website) from hiding the data, allowing for full inspection of the upload between client 704 and isolation container 738.

Figure 19:
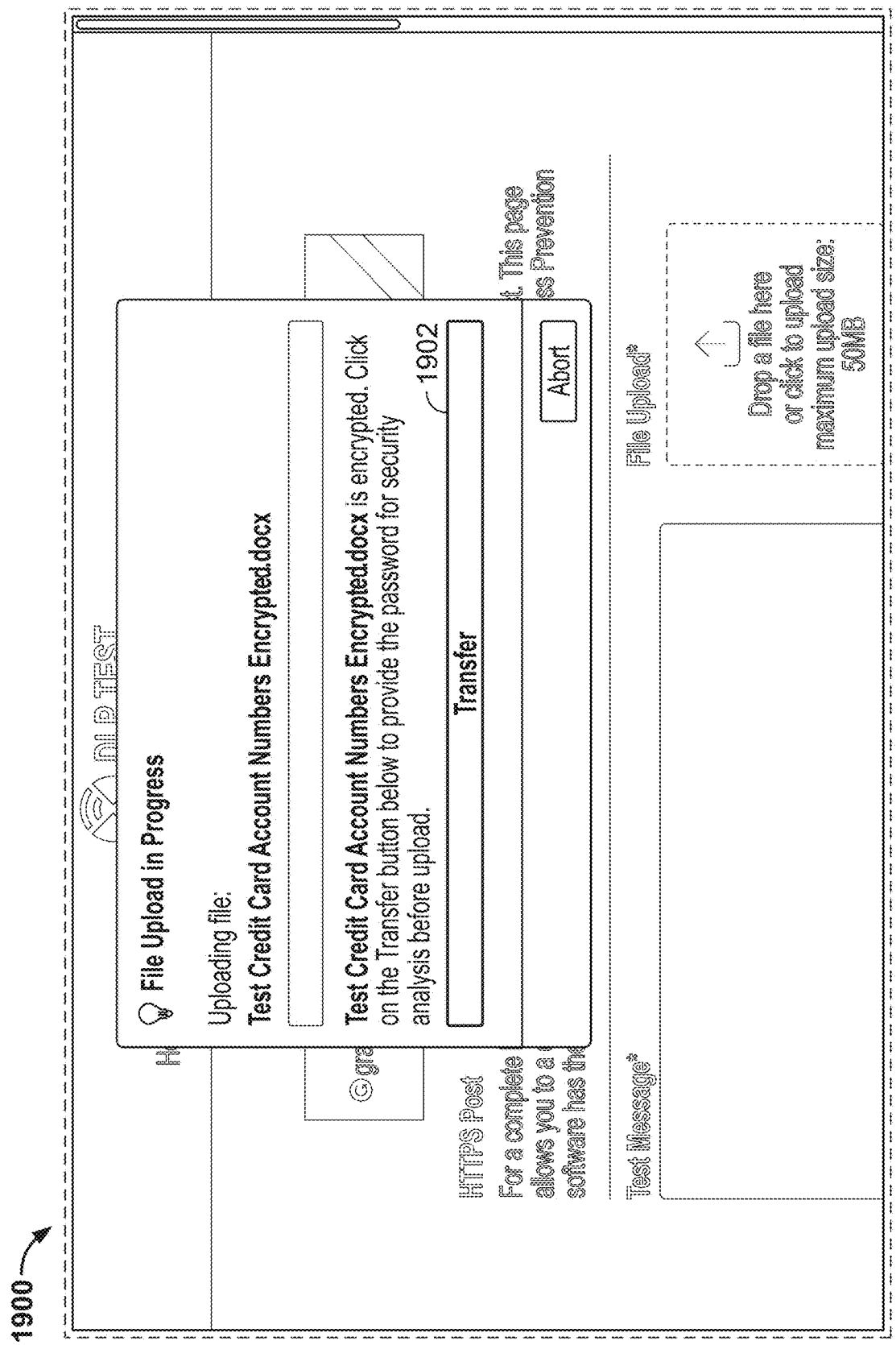
FIG. 19 illustrates an example of an interface.
Figure 20:
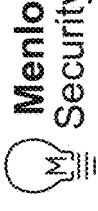
FIG. 20 illustrates an example of an interface.

When the file upload is completed from client 704 to isolation container 738, as described above, the isolation container will notify file server 748. File server 748 identifies that the uploaded file is an encrypted file. Because surrogate browsing system 702 controls the client browser and the response to the remote website, and also has the entire file, system 702 (e.g., via file server 748 which also includes web server functionality) is able to prompt Alice (via the thin client) for the password needed to decrypt the file. An example of such a prompt, rendered in an interface, is shown in FIG. 19. If Alice clicks on region 1902, she will be presented by surrogate browsing system 702 with a password submission interface such as is shown in FIG. 20. The interface can be customized by an administrator to include an applicable corporate logo, custom text, etc. (stored as static resources 732), to help Alice be confident that the password request is not a phishing attempt (e.g., by dlptest.com). Further, information such as the destination (e.g., dlptest.com) is shown in interface 2000 to help Alice confirm that the site to which she is attempting to upload the file is indeed the location she is intending to upload to.

If Alice is unable to supply a valid password (or clicks cancel) during the upload process, the file upload can be blocked (or allowed but with additional logging, notifications sent, etc., as applicable) as configurable by an administrator. Further, as applicable, system 702 can attempt to decrypt the file without Alice's password (e.g., where the file is protected with weak encryption and can be brute forced.) If the correct password is entered, the file is decrypted within isolation container 738 (or other appropriate location within surrogate browsing system 702, such as a temporary container used by system 702 while analyzing the file) and further content inspection can take place before the file starts to upload to the dlptest.com website. Examples of such content inspection include identifying malware present in the decrypted file, capturing the decrypted file and pushing it to a customer owned archive store and/or customer provided email address, examining the document for attempted data exfiltration, and pushing the document out via a REST API to a customer specified system (which can return back a modified version of the file, e.g., that has parts redacted, removed, modified, or watermarked which will replace Alice's original file during upload to the external website). Further, different rules can be applied in different contexts, e.g., allowing Alice to upload her document to an internal website based on policy, while preventing Alice from uploading the same document to an external website. In addition, in some cases, a given encrypted file may include within it additional encrypted files (e.g., an encrypted ZIP file containing another encrypted ZIP file, containing an encrypted document). As checks are performed by surrogate browsing system 702, Alice can be prompted to supply passwords for any additionally encountered encrypted files which can in turn be checked as well.

Figure 21:
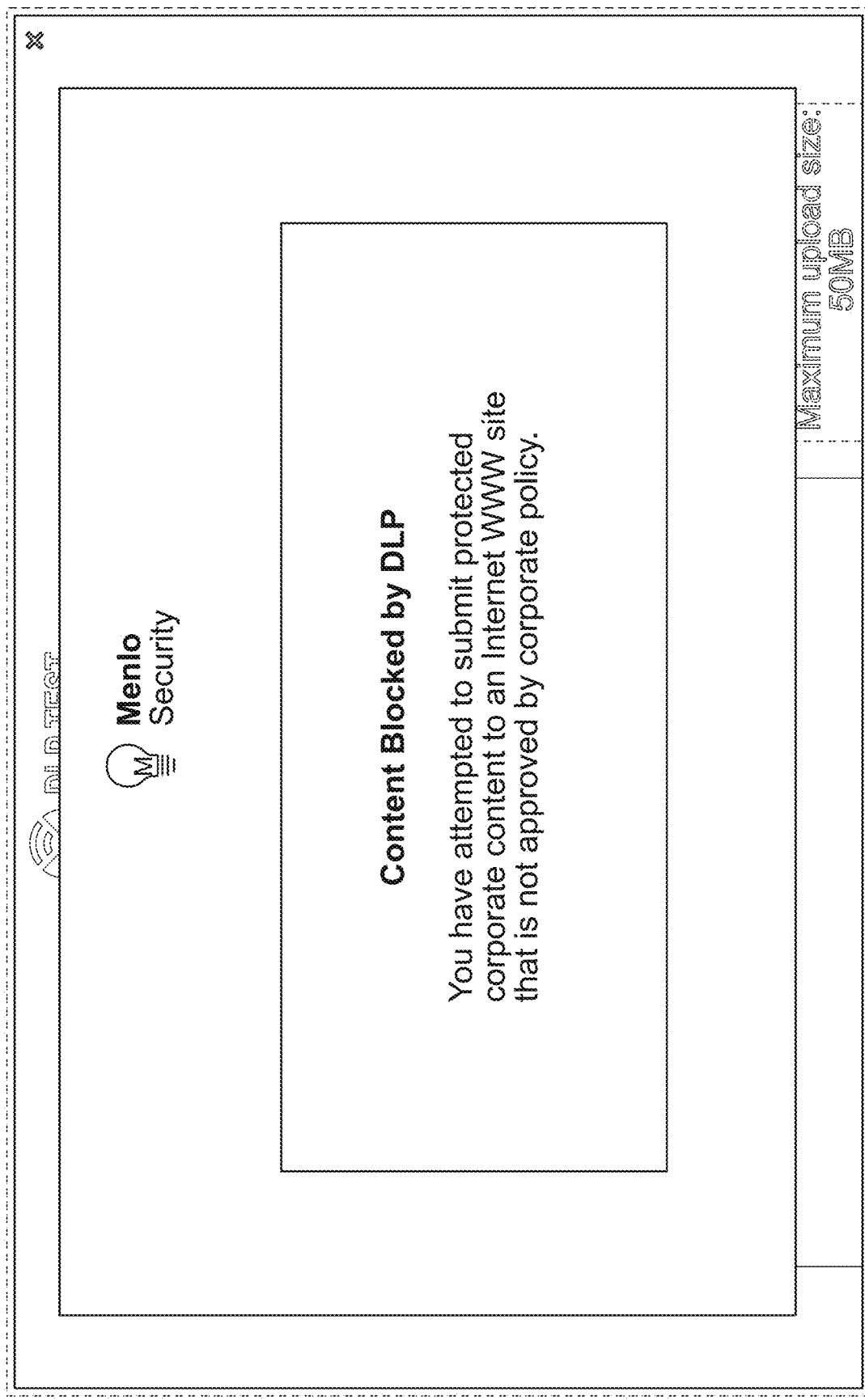
FIG. 21 illustrates an example of an interface.
Figure 22:
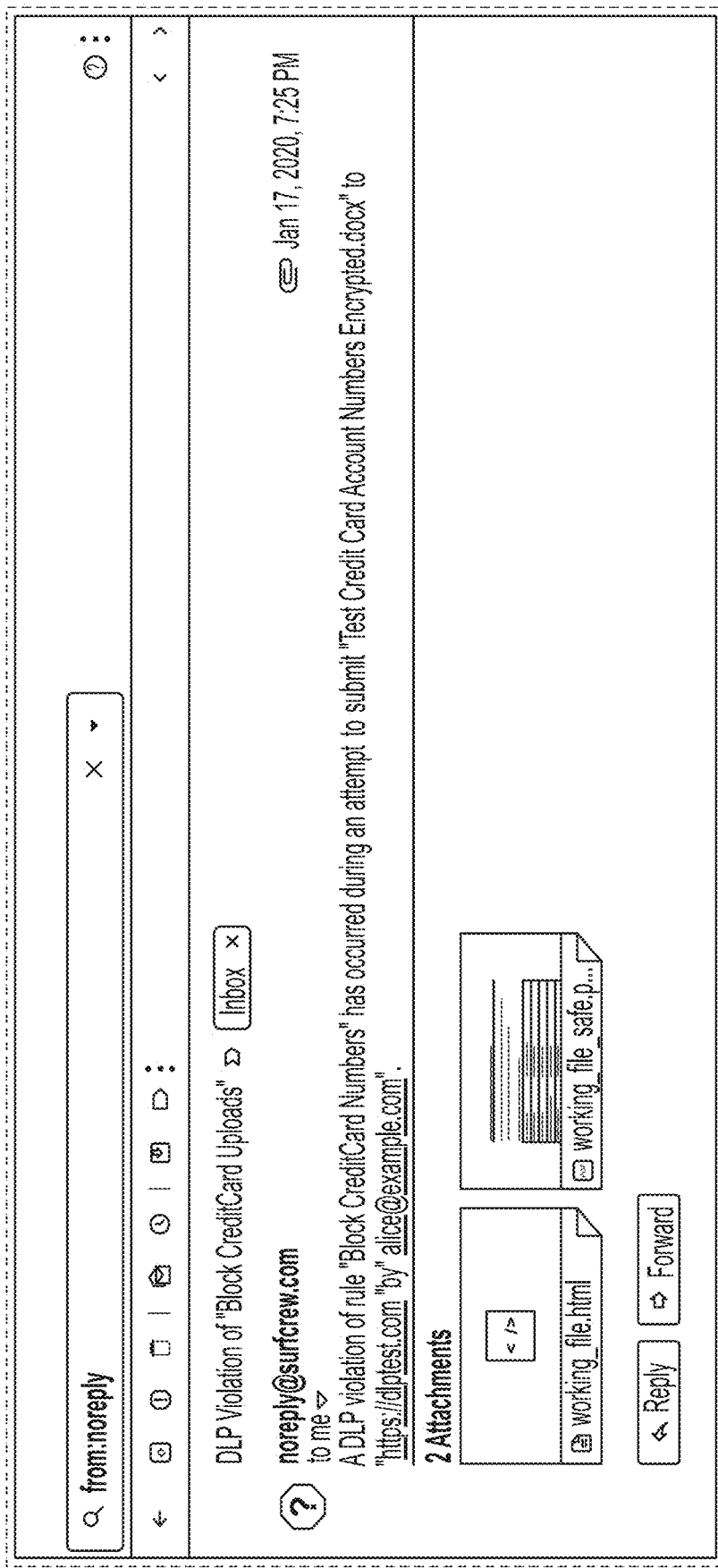
FIG. 22 illustrates an example of an email notification.

In the example shown in FIG. 21, Alice has provided the correct password for the document to surrogate browsing system 702. After decryption, surrogate browsing system 702 determines that contents of the file (i.e., credit card numbers) trigger the DLP rule shown in FIG. 17 and blocks the upload accordingly. In addition to notifying Alice that the file upload is blocked by policy, additional actions can also be taken as specified by the rule (e.g., logging, email notification, etc.). An example of a notification email that can be sent to auditors is shown in FIG. 22 and such notification can include attachments (e.g., including a (decrypted) copy of the file, a screenshot of the file, etc.) as applicable.

C. Example Workflow

Figure 23:
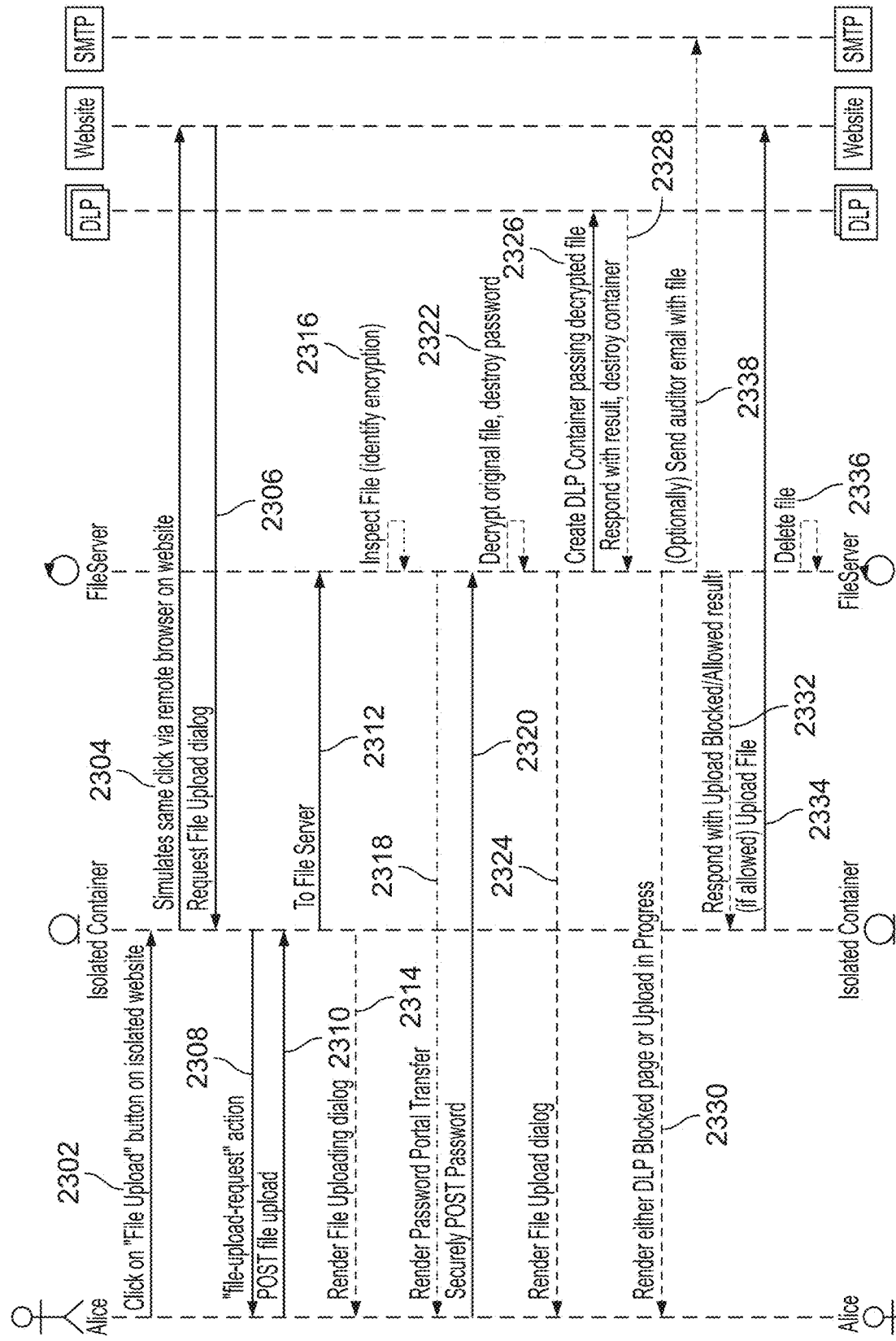
FIG. 23 is a flow diagram that illustrates a file upload.

FIG. 23 is a flow diagram that illustrates a file upload. First (2302) a user (e.g., Alice) clicks on a file upload button on an isolated website, which is intercepted by the isolated container. The isolated container simulates the same click to the remote website (2304). The remote website responds with a request file upload dialog (2306), which is passed on by the isolated container to Alice's client (2308). Alice selects a file (e.g., using a file chooser), which results in her browser performing a POST file upload (2310) from her browser to the isolated container. Once the upload is complete, the isolated container informs the file server (2312) which inspects the file and identifies that it is encrypted (2316). The file server, as it is also a web server, provides a password submission portal to Alice's browser (2318). After entering a password, her browser performs a POST of the password to the file server (2320). The file server uses the password to decrypt the file (2322), creates a container for analyzing the decrypted file (2326), analyzes the decrypted file, and responds with analysis results (2328), while displaying a file upload dialog to Alice (2324). Based on results of the analysis, either an upload progress bar, or a block message (or another appropriate message) is shown to Alice (2330). Further, as applicable, an auditor email can be sent (2338). The analysis result (e.g., block or allow) is provided by the file server to the isolated container (2332). If the upload is allowed, the isolated container provides the file to the website (2334). When processing is complete, the file server deletes the file (2336).

Figure 24:
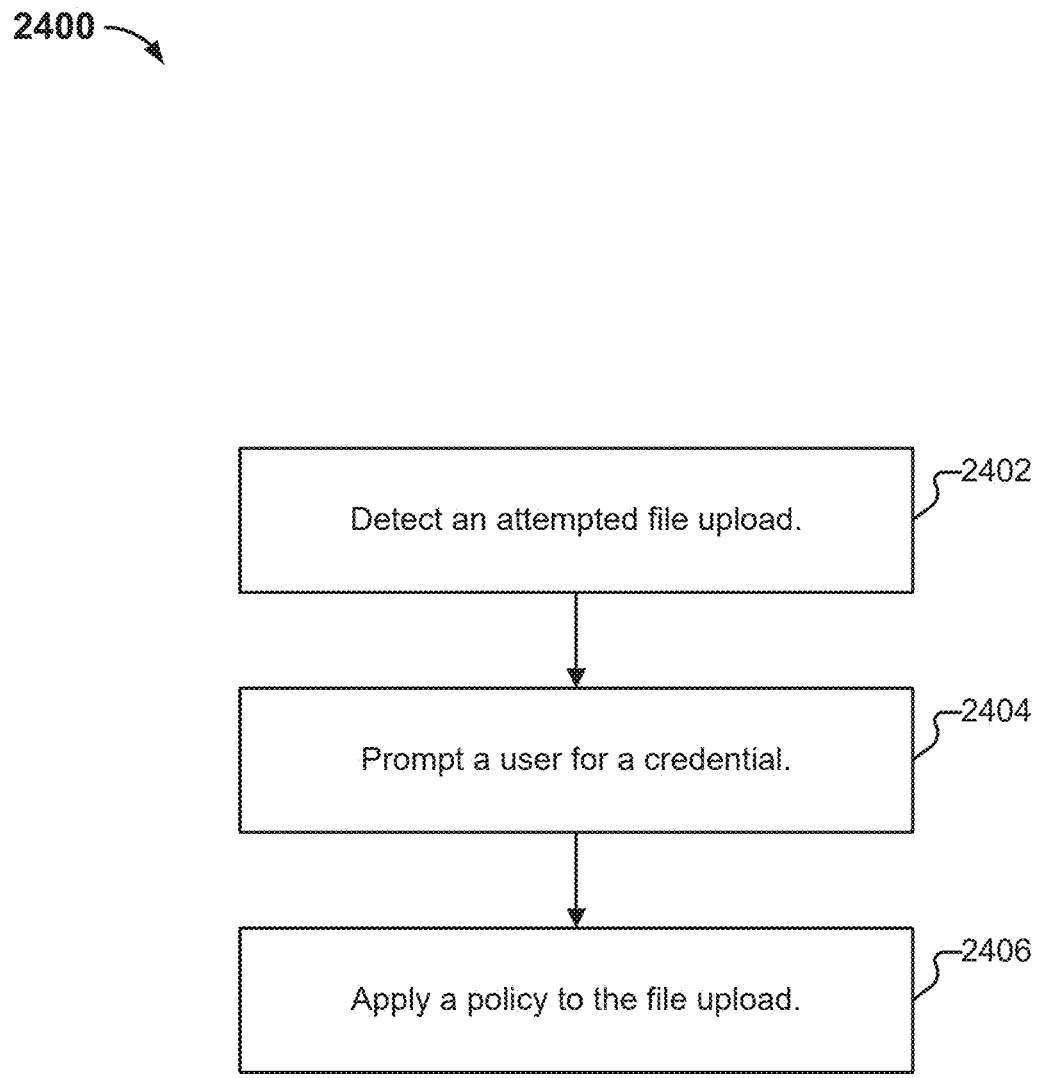
FIG. 24 illustrates an embodiment of a process for providing DLP to file uploads.

FIG. 24 illustrates an embodiment of a process for providing DLP to file uploads. In various embodiments, process 2400 is performed by surrogate browsing system 702. The process begins at 2402 when an attempted file upload is detected. An example of such file detection occurs when an isolation browser receives a request file upload dialog from a remote website (e.g., at 2306 in FIG. 23). At 2404, a user is prompted for a credential. An example of such prompting occurs when surrogate browsing system 702 provides Alice with interface 1900 shown in FIG. 19. Finally, at 2406, a policy is applied to the file upload. As one example, if the user provides a valid credential (e.g., that decrypts an encrypted file) and any applicable checks performed on the file succeed (e.g., no DLP or other violations are found), at 2406, the file is uploaded by surrogate browsing system 702 to the remote website. As another example, if the user fails to provide a credential, clicks cancel, etc., the file upload attempt can be terminated. As yet another example, if the user provides a credential, but the file is determined to violate one or more policies, appropriate actions can be taken, such as notifying an auditor, alerting the user that the file upload is blocked, etc.

V. EDGE NETWORKS FOR SURROGATE BROWSING AND DIRECT TRAFFIC VIA PROXY

A. Introduction

Network address translation (NAT) is a difficult problem with few options to solve without high cost or operational overhead. Various techniques described below can be used to improve edge networks used in various embodiments of environments such as the environment shown in FIG. 7. As one example, an address block (e.g., IPv4) can be used by surrogate browsing system 702, along with an Autonomous System Number (ASN), to improve and manage the IP reputation of egress traffic (e.g., from system 702). This can help allow large network providers to identify surrogate browsing traffic as legitimate/known/trusted. Further, customer traffic (e.g., originating from client 704) can be transmitted to the Internet in an operationally and fiscally effective manner that allows for fault tolerance, clean failure management, and scalability (including horizontal scalability) using techniques described herein. This is in contrast with existing solutions (e.g., for network address translation (NAT)) which are performed in one of a few ways currently. The first approach is to use commodity hardware, scaling hardware vertically to increase capacity while running standby nodes to provide the ability to failover. The second approach is to use commercial purpose built hardware deployed in high availability (HA) pairs. Both approaches have drawbacks with regards to failure management, generally focused around a single active node with standby nodes to handle failure. In cases where multiple active nodes are in use at the same time, existing implementations generally shard or spread connections across those nodes meaning that the loss of any one node affects only a subset of connections.

An alternate approach is to manage the state of traffic in such a way that a cluster of NAT nodes can be seamlessly horizontally scaled up or down without impacting the client that is generating the traffic. Due to the state synchronization, any tcNAT component within a datacenter is aware of all traffic states, allowing for asymmetric routing and seamless replacement or removal of live components. Due to how connection information is synchronized, there is an upper limit to how many requests can be generated per second, in some embodiments. At the point where this limit is reached, sharding of NAT clusters can be used. This approach allows for scalable NAT on commodity hardware, lowering the cost. The custom state machine synchronization simplifies architecture allowing for asymmetric traffic which simplifies operational overhead. It provides the ability to manage customer traffic across edge locations with strong failure management and scale.

One approach to improving user experience is to use a fleet of virtual machines (also referred to as "bounce nodes" herein) in cities around the world. This allows customer web traffic to originate from specific geographic locations. In an example implementation, the fleet are collectively hosted by approximately fifteen different service providers-some hosted by Amazon Web Services (AWS), some with "bring your own IP," some hosted by a range of virtual private server (VPS) providers (e.g., of variable quality/trustworthiness). Google GCP can also be used. Which node within the fleet can be selected, for example, per site or per customer, and customers can also pay for fixed egress IPs. In an example embodiment, surrogate nodes (e.g., isolation node 708) connect to bounce nodes via OpenVPN tunnels. Bounce nodes can be provisioned by configuration management tooling (e.g., Chef).

This approach provides a variety of benefits. A first improvement is that it can help address localization issues. With multiple bounce node geolocations, more accurate/appropriate localization can be provided to the user (e.g., providing localized results, localized advertisement targeting, language, etc.). Another benefit is that it supports IP-based allow lists, meaning that sites critical to a customer can permit access to specific IPs (e.g., only allowing access from particular bounce nodes, requiring particular client IPs to use particular bounce nodes, etc.). Yet another benefit is that it can help mitigate site blocking. As an example, some sites may choose to block AWS-based proxies/surrogates for a variety of reasons. For example, a retail site may block traffic from AWS as an anti-abuse/anti-bot measure. By using multiple service providers for the bounce fleet, if a given bounce node is blocked, another can be used for edge services.

While the above approach represents an improvement over existing techniques, a variety of issues may not be fully addressed.

Egress IP range management: The egress IP ranges are not necessarily fully managed by the operator of platform 702, which can result in IP reputation management/geoIP concerns and lead to greater complexity for customer allow list management.

DNS egress at edge: Some localization techniques are based on the origin IP for a DNS lookup. And, AWS Route53 Resolver can be blocked by upstream resolvers, breaking name resolution from AWS-based surrogates.

Provisioning/operations: With bounces nodes spread across several service providers, provisioning can be manually intensive. Each provider will have their own support workflows, payment methods, support agreements, service limits, etc.

Such issues can be mitigated using various embodiments of techniques described below (also referred to herein as "Recast Edge"). Examples of features provided in various embodiments include the following:

Unified address space/routing.
Consolidated bounce node management.
Termination of OpenVPN (if used) on edge gateway instances.

A variety of components and technologies can be used (and will be described in more detail below). As an overview:

OpenVPN: Instead of being used directly to edge nodes, proxy/surrogate nodes connect to edge gateways. Other technologies can also be used and/or OpenVPN can be omitted.
A Wireguard/overlay network is used to connect edge gateways to edge egress nodes.
Generic Linux machines can be used to serve edge routing infrastructure/NAT egress.
BGP topology is leveraged.

The approach significantly improves resilience, including by surviving failure of individual nodes at the edge and providing resilience even in event of total edge datacenter loss. The approach is also more scalable, with improved capacity management, improved operability, and ingress management. Various aspects of embodiments that make use of these techniques are described below.

B. Numbering and Public IP Allocation

In various embodiments, surrogate browsing system 702 makes extensive use of public IP addressing to support clients egressing out of different geographies and with different geoIP profiles. A /16 IPv4 network within control of an operator of browsing system 702 is used for public IPv4 connectivity, with an existing /32 IPv6 network available for IPV6 connectivity.

1: Numbering Concepts

Within surrogate browsing system 702's client VPCs, there can be cases of overlapping IPv4 usage. In various embodiments, surrogate browsing system 702 uses IPv6 addressing, along with a number of supporting numbering concepts, to disambiguate overlapping client IPv4 address space and permit a single global environment to provide services to clients within overlapping IPv4 networks. Those supporting numbering concepts are described herein.

Recast Edge Zone ID (REZID)

Surrogate browsing platform 702 uses the notion of a Recast Edge Zone ID (REZID) in order to permit a single global Recast Edge infrastructure to be able to service these overlapping IPv4 client ranges. A 16-bit REZID is allocated to each Availability Zone where Recast Edge Gateways are deployed, with each REZID being globally unique within a deployment environment. The REZID is incorporated into a /96 IPv6 Unique Local Address (ULA) prefix, with the original client IPv4 address mapped into this REZID-mapped prefix.

The base IPv6 ULA prefix for this IPv4-to-IPv6 translation in some embodiments is fd00::/80, with the REZID encoded into bits 81 to 96 in the address to form a /96 address, i.e. fd00::<REZID>: 0:0/96. For example, a REZID of 0x1 would form a VPC IPv6 prefix of fd00::1:0:0/96. The original client IPv4 address is then mapped into the last 32 bits of the address to form a /128 host address. For example, a client/source IPv4 address of 192.168.1.2 that ingresses through a Recast Edge AZ with REZID of a1 would be IPv6-mapped to address fd00::a1:192.168.1.2/128.

This provides a client IPV6 address that is globally unique and directly routable across the global Recast Edge platform.

Recast Edge Realm (Redge_Realm)

While the REZID provides disambiguation of overlapping IPv4 addresses across the whole platform once the original client addresses has been translated into the REZID-mapping IPV6 address, initial connectivity between the client VPC and the Recast Edge Gateway VPC is still via IPv4 via AWS VPC peering in some embodiments. AWS does not permit IP overlap between peering VPCs. If there are IPv4 address space collisions between different client VPCs in a given AWS region, it would not be possible to have both of those clashing client VPCs establish VPC peering to a single Recast Edge gateway VPC in the region. In this scenario, a second Recast Edge gateway VPC is provisioned within that region.

When an additional Recast Edge gateway VPC is deployed in a region, the AZs in that VPC are allocated Recast Edge Zone IDs from the same REZID numbering space. The notion of a Recast Edge Realm (redge_realm) is introduced to distinguish between multiple Recast Edge gateway VPCs within a given AWS region. There can be any number of Recast Edge gateway VPCs in a given AWS region, but only one Recast Edge gateway VPC per realm per region.

REZIDs are unique throughout a given deployment environment, including across all Realms within a given deployment environment.

By convention, the first Recast Edge gateway VPC in a region is assigned to realm 0, the second to 1, and so forth. The Recast Edge Realm is not directly mapped into IP addressing, but is used in service discovery for client VPC hosts to discover their egress Recast Gateway path. The redge_realm is a top-level key in the Recast Edge VPC catalogue. A client that needs to find the Recast Gateway VPC for a given client VPC can find the gateway VPC through first the redge_realm and then the resident AWS region.

Recast Edge Wireguard Site ID (WGSID)

A Wireguard Site ID (WGSID) uniquely identifies a site with Recast Edge infrastructure, specifically Recast Edge egress Points of Presence (POPs) and AWS VPCs containing Recast Edge gateways. The WGSID is a 16-bit identifier and is encoded into a set of IPv6/96 prefixes for communication between Gateways and Routers (edge POP).

WGSIDs for Recast Edge POPs are numbered starting from 0x1; WGSIDs for Recast Edge gateway AWS VPCs are numbered starting from 0x8001. WGSIDs are globally unique across all Recast Edge Realms within a given Recast Edge deployment environment.

REZIDs are unique per AWS AZ in a deployment environment (one REZID for each AWS AZ), while WGSIDs are unique per AWS VPC or Recast Edge site (one WGSID for each AWS VPC or Recast Edge site).

Two IPv6 ULA/96 prefixes are assigned for this connectivity:

fdfe::/96—Wireguard (wg0 interface) network
fdff::/96-Geneve (geneve0 interface) network The WGSID is inserted into bits 97-112 (the second to last "hextet") in the base prefixes, with host addresses for nodes in a given site numbered in the last 16 bits ("hextet") of the address.

As an example, router2 in a Recast Edge POP with WGSID 0x15 would have the following IPv6 addresses:

wg0 address: fdfe::15:2/96
geneve0 address: fdfd::15:2/96

The base /96 prefixes plus the 16-bit WGSID yields a 112-bit number (96+16). Addresses are not configured with /112 masks, but rather as /96. The unique 112-bit prefix per site provided by the WGSID distinguishes between sites and avoids address collisions, but in actual connectivity, in some embodiments, two flat /96 networks are created (fdfe::/96 (wg0) and fdff::/96 (geneve0)) for an entire Recast Edge deployment environment, with hosts in each network all directly adjacent to one another.

Deployment Environments

Recast Edge infrastructure is able to support a full, global client environment, even encompassing IPv4 address conflicts between client networks via techniques described herein. Multiple instances of the Recast Edge infrastructure can also be deployed in different environments, for example Development (dev) and Production (prod) environments. Different environments are completely isolated from one another, with no data or control plane connectivity between them. A given client can only ever be connected to a single environment at a time. The only shared resource or numbering between deployment environments is ultimately the public IP space on which customer traffic egress to the public Internet. All other numbers beside the public prefixes are scoped for uniqueness within a given deployment environment. No numbering resources or IDs, except for public IP prefixes, need to be unique across deployment environments. When allocating identifiers and numbering, count deployment environments as discrete namespaces. For example, if a dev1 deployment environment has WGSIDs 1-10 and 8001-8010, and REZIDs 1-28, and a prod1 environment is created, those existing WGSIDs and REZIDs are not excluded from the dev1 environment. All identifiers and numbers are unique within a given deployment environment only.

The following identifiers and numbers are examples of ones that are non-unique and separately namespaced across deployment environments:
- Recast Edge Realm (redge_realm)
- Recast Zone ID (REZID)
- Wireguard Site ID (WGSID)
- Client VPC IPv4 addressing
- Recast Edge VPC IPv4 and IPv6 prefix
- Wireguard (wg0) IPv6 addressing
- Geneve (geneve0) IPv6 addressing 2: Public IP Usage for Recast Services and Clients Use of IPV6 for Recast Services The following are example public IP address specifications for use in Recast Edge services:
- Shared source NAT egress networks
- Dedicated "Fixed Egress" source NAT egress networks
- Spare source NAT egress networks (reputation management)
- Ingress endpoint networks
- Regional or global anycast service networks IPv6 transport addressing within the Recast Edge platform is specifically selected from the Unique Local Addressing (ULA) prefix of fd00::/8, as indicated above. This allows Recast Edge functionality of surrogate browsing system 702 as an underlay to customer traffic, and both the platform control plane as well as underlay forwarding plane (dataplane) are intentionally scoped to be reachable only from within the Recast Edge network itself; it explicitly and intentionally does not have public Internet access.

To address the need to provide internal network reachability between Recast services (not limited to Recast Edge, but including Recast Observability or Recast Container Platform) and other internal clients or services of surrogate browsing system 702, IPv6 connectivity is used in some embodiments. This includes cases of both connectivity between discrete Recast components, such as between Recast Edge and Recast Observability, as well as between Recast platform services and other internal surrogate browsing system 702 endpoints, such as between the Recast Edge platform and internal surrogate browsing system 702 control plane services. Connectivity for these resources are numbered from IPV6 Global Unicast Addressing (GUA).

Examples of use cases or consumers for public (GUA) IPv6 addressing:
- Recast Observability
- Recast Containers
- Recast Edge public egress and ingress (all use cases described above)
- Recast Edge internal client connectivity Aside from service ingress and egress addresses, Recast Edge infrastructure hosts use public (GUA) IPv6 addresses to use as source addresses when they need to communicate with other internal surrogate browsing system 702 services that are accessible via GUA IPv6.

Allocation Mappings to AWS Regions

In various embodiments, surrogate browsing system 702's services, save for Recast Edge as a transport platform, are generally deployed to AWS. AWS currently maintains 26 regions across the globe, with another 8 regions announced, for a combined count of 34 regions deployed or announced. When assigning IPv6 prefixes to Recast or other surrogate browsing system 702 applications to cover AWS deployment, 32 prefixes (5 bits' worth of prefixes) could be insufficient to cover all live and announced regions. In some embodiments, global assignments that need to account for AWS deployment allocate a minimum of 6 bits worth of prefixes (64 prefixes).

IPv6 Nibble Boundary Assignment and Reservations

Generally, IPv6 subnetting guidance is to subnet at nibble (4-bit) boundaries to simplify subnetting notation and math. When a calculated allocation for a prefix requirement falls outside of a nibble boundary, and as applicable, one can:
- Calculate the nibble-aligned prefix size for the allocation.
- Reserve a prefix the size of that nibble alignment.
- Allocate a prefix the size of the calculated required prefix length as the initial allocation for the request.

Recast Edge Service Block Usage

Each Recast Edge egress geography has at least, for each of IPV4 and IPV6:
- 1× primary shared egress source NAT prefix.
- 2× backup shared egress source NAT prefixes (blocklists, reputation management).
- 1× Dedicated "Fixed Egress" source NAT prefix.

A "Recast Edge egress geography" is not a 1:1 mapping to Recast Edge POPs. A single Recast Edge POP may service a number of discrete egress "spoke" geographies, e.g., Milan and Geneva are spokes routing via Frankfurt as a hub.

In addition to the minimum set of prefixes above, a set of ingress service prefixes may also be allocated to select geographies. "Hub" sites are an example target for ingress prefixes, though ingress prefixes can also be deployed to some "spoke" locations. In an example implementation, an ingress prefix is allocated to each geography.

The smallest prefix (longest network mask) that can be reliably exported to the public Internet is a /24 for IPV4 and a /48 for IPV6. In an example environment, 8 bits of subnetting are available in a IPv4 prefix of a /16, permitting 256x/24 prefixes. In IPV6, access to a /32 is available, providing 16 bits of subnetting for a total of 65,536x/48 prefixes.

Each Recast Edge geography is assigned 4× IPv4/24 prefixes, i.e. an IPV4/22 prefix, to cover egress requirements described herein. Ingress service blocks for IPV4 can be allocated in the future as /24 prefixes as needed.

Each Recast Edge geography is assigned a single IPv6 service/48 prefix. All individual service usage prefixes, including all needed egress and ingress requirements, are allocated from within this/48 site prefix. The risk is low that a full/48 prefix would become unusable due to reputation issues, but in some embodiments, a spare/48 prefix is held in reserve for each Recast Edge geography.

Recast Edge AWS Usage

Recast Edge has some components operating within AWS, in some embodiments, such as gateway VPCs as well as Consul services.

Consul services have IPv6 connectivity in place, but generally only require internal connectivity via IPv6, not public IPv6 connectivity.

Gateway instances use IPv6 ULA prefixes for control and data plane functionality, as described above, but are allocated GUA addressing for access to other internal services (e.g. Consul) and to permit future public Internet access via IPv6.

3: Initial Public IPv4 and IPv6 Allocations

General Purpose AWS IPv6 Allocation

AWS permits tenants to import IPv6 prefixes up to/48 per region for use with public Internet connectivity via their BYOIP capability. AWS also permits a parent IPv6 prefix to be shared across accounts within an Organization via Resource Access Manager. This permits AWS Organizations to:

Import one or more parent IPv6 prefixes ("supernets") via BYOIP.

Delegate /48 (or shorter) publicly exportable prefixes to individual regions, from those supernets.

Assign /56 prefixes from those regional /48s as VPC CIDR blocks to individual VPCs across Organization accounts.

In some embodiments, a single parent IPv6 block is assigned by surrogate browsing system 702 for each AWS Organization or function, for the region pools within those blocks to be marked as exported, and other AWS mechanisms to be used at VPC level and below to control public Internet access to AWS resources over IPv6. Within each of three different AWS organizations, a /42 allocation is allocated:

A /48 pool per region.
256 IPv6/56 VPC CIDR prefixes per region.
64x/48 region prefixes per/42 parent pool.

Recast Observability IPv6 Allocation

Recast Observability has region-specific deployments, necessitating an IPV6 address block per deployment region. A number of discrete networks may be required per site for different functions or applications. Allocating a single nibble worth of subnets at a given site would provide 16 networks per site, which could potentially be insufficient or artificially limiting. Increasing this to 8 bits of subnetting per site raises this to 256x/64 networks per site, which provides additional headroom. That would assign a /56 prefix per site, which could not be independently exported to the public Internet. A minimum of a /48 prefix per site is allocated. Six bits of subnetting space for/48 regional prefixes can be allocated, requiring a /42 allocation. Per Nibble boundary assignment and reservations, a nibble-aligned prefix of length 40 is reserved for Recast Observability, with an initial/42 prefix allocated from within that reservation.

Recast Containers IPv6 Allocation

Example Assumptions:

/64 per worker/container host.

Up to ~2,000 workers per cluster or container host "group."

One cluster or container host "group" deployed to each AWS region where surrogate browsing platform 702 is active.

At least one service network (/64) per region.

A small number of discrete control plane prefixes, e.g. one per AZ (~4 per region).

Support per-region BYOIP public Internet access (minimum/48 per region).

Supporting 2,000 workers per region would require 11 bits of subnetting, thus a /53 to provide 2,048/64 networks. Shifting to 12 bits to align on a 4-bit boundary provides some headroom at 4,096/64s per region. These figures are both smaller allocations than the minimum/48 required for public Internet export, so a /48 per region can be safely allocated while ensuring sufficient subnet space within regions.

Recast Edge IPv4 and IPV6 Allocations

Additional public IP address space may be required to support the ingress use case. In some embodiments, each Recast Edge geography is allocated an IPV4/22 prefix and an IPv6/48, with a second/48 prefix held in reserve (if available).

The public IPv4/16 block is considered to be dedicated for Recast Edge use. Required/22 prefixes are allocated to Recast Edge geographies as needed from the /16 supernet.

An example implementation of Recast Edge uses 20 geographies. An expanded version raises this to 120 egress sites if transit providers are able to service that many points of presence. A/40 IPv6 allocation is sufficient to cover 120 sites with a /48 prefix per site, permitting for a total of 256x/48 prefixes in total. Expanding this to a /38 or a nibble-aligned/36 prefix provides room for significant growth and expansion as needed. This also supports reserving an additional/48 prefix per Recast Edge geography.

Distribution of Recast Edge Public Prefixes

Actual assignment of publicly routable prefixes can be done either arbitrarily (e.g., increment from the most recent assignment to the first available free prefix), or have a specific allocation scheme for how blocks are ordered or allocated. For Recast Edge routable prefixes, the following are example allocation strategies:

Grouped by region, attempting to keep a contiguous block of networks within discrete large geographies (e.g. APAC, LATAM, EMEA, etc.).

Grouped by function, e.g. reserving a contiguous range for ingress networks.

Completely arbitrary: increment to the next prefix while walking through assignments to sites.

Region Grouping

Grouping prefixes by a region can provide "at a glance" visibility into which region a given address "belongs" to, and can provide support for simple failover strategies such as all POPs in a given region exporting both their more specific prefixes as well as the covering region prefix.

Grouping by region carries a high risk of "wrong sizing" of region supernets. Region level supernets need to be sized to permit allocation of current and future POPs or other prefixes within that region, while also not over-allocating the size of the supernet such that a lot of dormant space remains "locked up" within a region that ultimately has fewer allocations made from it than was expected.

Unfortunately, the "simple" failover strategy of exporting a regional supernet from all POPs in a given region can fail to account for the various failover constraints that may need to be respected, e.g., failure domains. Exporting a regional prefix that straddles more than one failure domain could permit traffic to a given prefix to ingress the Recast Edge network outside of its permitted failure domain. Shifting to supernets at the failure domain level can mitigate this concern, but at the cost of a proliferation of top level supernet "buckets" as new supernets would need to be allocated each time a new failure domain is identified or provisioned.

Functional Grouping

Grouping prefixes by "function" creates different top level buckets for different "types" of networks. Examples include:

Shared egress SNAT.
Fixed egress SNAT.
Load testing and development.
Ingress.
Regional anycast.

The same concerns of over- or under-sizing of regional supernets also apply to grouping by network function, though for the functional grouping there may be a less dynamic set of groups. Regional anycast blocks can be constrained to slicing at RIR type regions. Ingress blocks may proliferate somewhat, but can be constrained to a subset of "hub" POPs rather than needing to allocate an ingress prefix to every single POP, for instance. Load testing or development blocks can be similarly constrained and flexible in deployment. The bulk of surrogate browsing system 702's prefix usage will be for Shared and Fixed egress SNAT, which can be co-mingled in a general SNAT block.

Grouping by function need not be mapped to routing, but can potentially be consumed in ACLs or other network-based identification, and can map into ranges as opposed to needing to fit strictly within contiguous supernets. Smaller allocations can be made to start with, supporting allocating additional smaller sized prefixes to a given function in the future, as opposed to needing to "right size" a function group for all possible future uses.

Incrementing Allocation; No Grouping

Incrementing allocations on a "next available" basis is the simplest from an allocation standpoint. It offers no options for identifying networks from their numbering or for aggregating prefixes in routing advertisements. Simply incrementing prefixes at allocation time indicates that no meaning is ascribed to network numbering, and no meaning should ever be inferred from a given address. Without having any meaning ascribed to groups of prefixes, any systems that would need to ascribe meaning to networks, for instance for ACL generation based on network function, will need to have access to a system that provides a listing or mapping of prefixes for the desired meaning or role.

Grouping and Allocation Scheme Decision

A top level set of initial functional groups is created and used on a "best effort" basis for grouping networks by function, as described above. Functional network group sizing should err on the side of smaller allocations, as it is simpler to allocate additional, small blocks, than it is to reclaim portions of an oversized block.

Appendix: Internal Vs External (Public)
Connectivity for AWS BYOIPv6

Access to and from the public Internet from AWS functions differently for IPV4 and IPv6. For IPV4 workloads, VPCs can be assigned a private subnet (RFC1918 networks), a public subnet (IPv4 networks routable on the public Internet), or both. If workloads are assigned only to a private subnet, they can still be provided access to the public Internet by means of NAT gateways.

There is no exact analogue for "private" and "public" networks in IPV6 connectivity within AWS. ULAs can be considered somewhat of an analogue to RFC1918 IPv4 space; however:

Use of ULA with a NAT66 translation is highly discouraged.

ULA networks are not supported in AWS.

All IPv6 AWS VPC subnets must use Globally Unique Addressing (GUA).

AWS does permit creation of "internal only" IPv6 subnets, which are not reachable from the public Internet. "Internal" networks here still use Globally Unique Addressing, but are assigned from IPV6 subnets that AWS does not advertise to the public; they are valid GUA IP addresses, but they are not exported to or routable on the public Internet.

When using AWS BYOIPv6, users control whether a given prefix is exported at the region level. A prefix pool of/48 or shorter (larger network) is assigned to a region, and a flag is set on that regional prefix for whether the prefix should be exported to the public Internet. VPCs within that region, which received IPv6 subnets from this region pool, cannot toggle public export at the VPC or subnet level.

Unlike for IPv4, users that select to use a subnet from an internal (non-exported) IPv6 prefix cannot use NAT gateways or other translation mechanisms to enable IPv6 connectivity to the public Internet. NAT gateways can be deployed for IPV6-only subnets, but NAT gateways for IPV6 clients perform NAT64/DNS64, connecting to IPv4 endpoints on the public Internet, not direct IPv6 connectivity.

Native IPv6 connectivity to the public Internet can be managed by two example methods:

The subnet is exported/advertised to the public Internet.

The VPC routing table has a default (::/0) route to an Internet gateway.

This means that VPC subnets that are provisioned from a regional pool that is not advertised to the public Internet cannot gain native IPv6 public Internet connectivity unless the entire regional pool is altered to be publicly exported, which would affect not just that individual VPC subnet but all VPC subnets allocated from the same pool. Resources connected to a subnet that is not exported need to be renumbered to use a VPC subnet that is exported for public Internet connectivity.

For Recast Edge AWS resources, in some embodiments, only a single IPv6 pool is provisioned by surrogate browsing system 702 where all regional IPv6 pools are exported. Individual VPC networks will have their Internet access controlled by the presence or lack of an Internet Gateway on the affected VPC routing table.

IPv6 subnets do not have public Internet access provisioned by default. This ensures that enabling public Internet connectivity for IPV6 resources is an opt-in operation, such that IPv6 subnets do not have public Internet exposure by default and explicit steps must be taken to provide that connectivity.

C. Example Architecture

Figure 25:
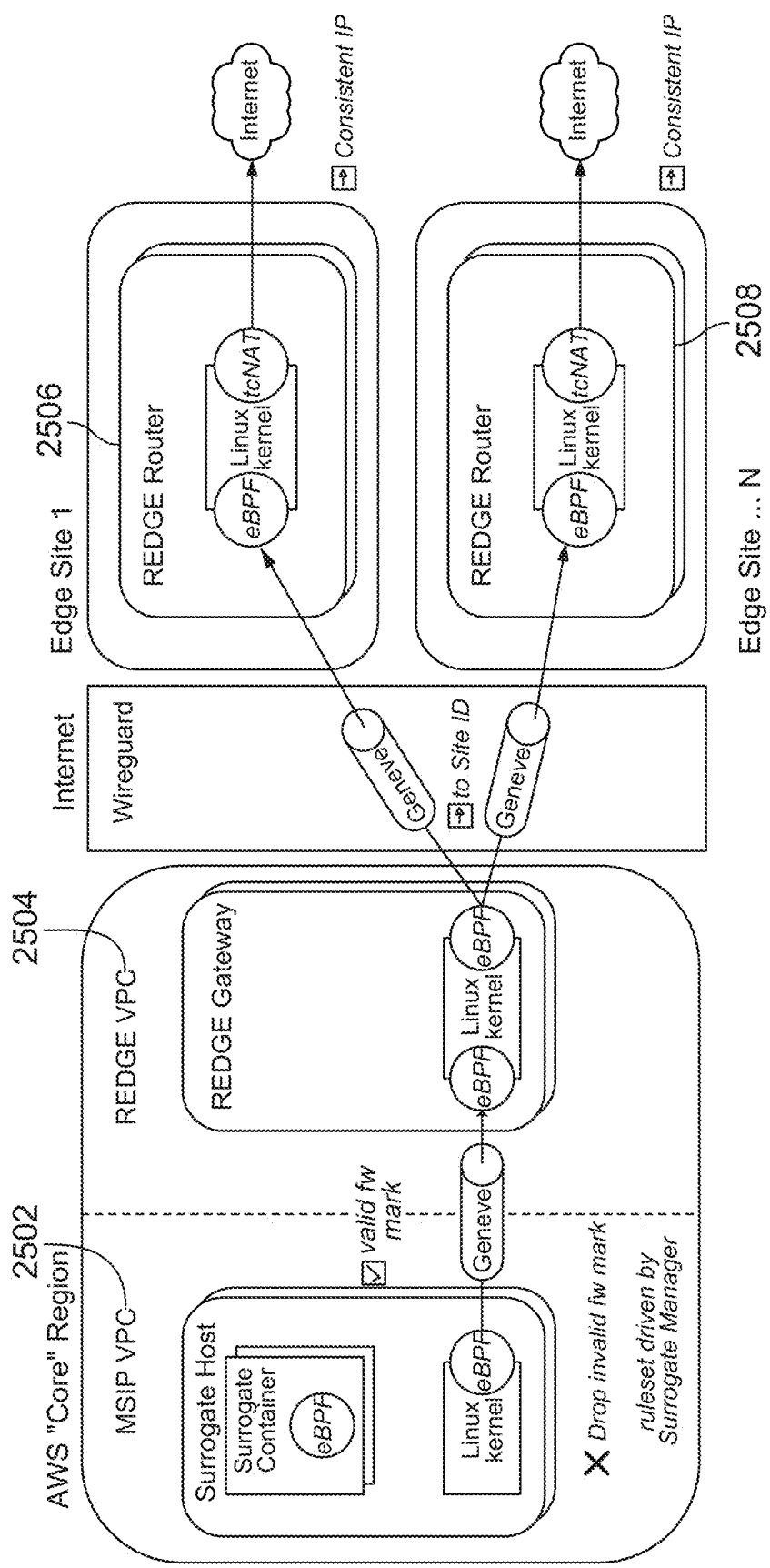
FIG. 25 illustrates example architecture for providing edge networks for surrogate browsing.
Figure 26A:
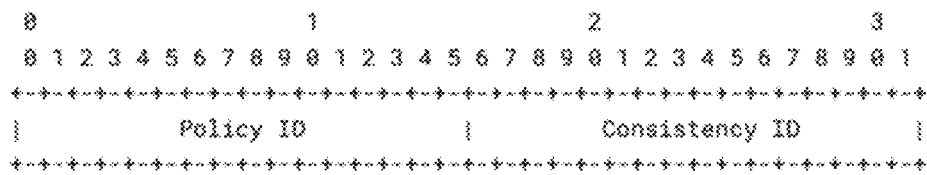
FIG. 26A illustrates an example format for a policy mark.

FIG. 25 illustrates example architecture for providing edge networks for surrogate browsing. In the example shown in FIG. 25, a client (running on server 2502), such as a proxy or Surrogate Container, opens a socket to transmit a tenant request. A setsockopt operation is then used to set an SO_MARK (firewall mark or "fwmark") value on the socket, to signal the Recast Edge policy mark. Packets transmitted by the client will all have this firewall mark value applied. This setsockopt operation of setting the firewall mark requires the elevated CAP_NET_ADMIN capability. An example format for a policy mark is shown in FIG. 26A. The policy ID has 65,536 ($2^{16}$) possible policies in some embodiments.

The firewall mark is only locally significant: it cannot be transmitted across the network, and is only present within network processing on the host where the mark was applied. A separate mechanism is required for communicating the policy mark across the network between hosts.

The Geneve encapsulation protocol permits the user to encode arbitrary Type-Length-Value (TLV) data into its encapsulation header, and is used to carry the Recast Edge policy mark between hosts in various embodiments. Other encapsulation protocols can also be used, such as Generic UDP Encapsulation (GUE) or Virtual extensible Local Area Network (VXLAN) and techniques described herein modified as applicable. As traffic leaves a Recast Edge network node, the firewall mark that carries the policy mark is encoded into a Geneve header by means of an eBPF program. When Geneve traffic is received by a Recast Edge network node, the policy mark is extracted from the Geneve encapsulation header and applied to the payload traffic as a firewall mark.

While Geneve TLVs have longer length limits that allow for encoding extensive information, this Geneve encapsulation data is stripped on ingress t a given host and is not carried across in means accessible to all network applications or the general Linux network stack. As such, the policy mark must be passed by Geneve across the network, but persisted across a given host in the Linux firewall mark. As the Linux firewall mark is limited in size to 32 bits, this imposes an upper bound of 32 bits on the total combined signaling data that traverses the Recast Edge network for a given packet or flow.

Gateway nodes (e.g., running on server 2504) in the Recast Edge network read the policy mark on tenant traffic and use this mark to direct traffic to the indicated Recast Edge POP for egress to the public Internet. Gateway nodes accomplish this by maintaining a discrete routing table for each Recast Edge POP, with a set of default routes advertised from the Recast Edge POPs installed into these discrete routing tables. Routing rules are created on the Gateway nodes, mapping policy firewall marks to these routing tables. Traffic matching a given policy mark is directed by these rules into the routing table for the destination Recast Edge POP (e.g., running on server 2506 or 2508). This routing lookup is performed within eBPF code, and requires a Linux kernel patch to support eBPF route lookups that honor the firewall mark. Such patching is performed to various nodes used by embodiments of surrogate browsing system 702.

In some embodiments, the encoding of the policy mark is shifted to be carried in IP options, and to change the logic of how policy is translated into routing decisions when directing traffic to Recast Edge POPs. It has components where traffic is carried as IPv4 and others where traffic is carried as IPv6. Options are encoded in IPv4 options when transported in IPv4, and in an IPV6 Hop-by-hop Extension Header when transported in IPV6. An IP Options registry is used to track the assignment of IP options.

Figure 26B:
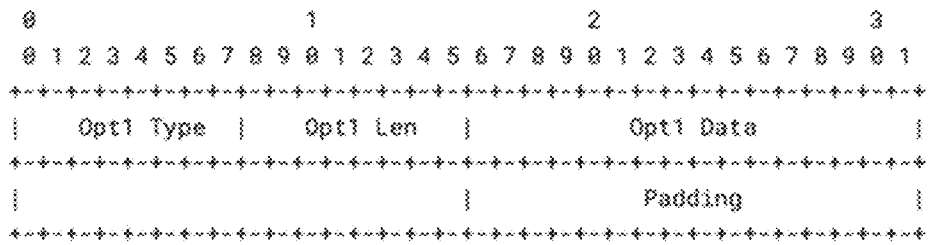
FIG. 26B illustrates an example of an IPV4 Options structure.
Figure 26C:
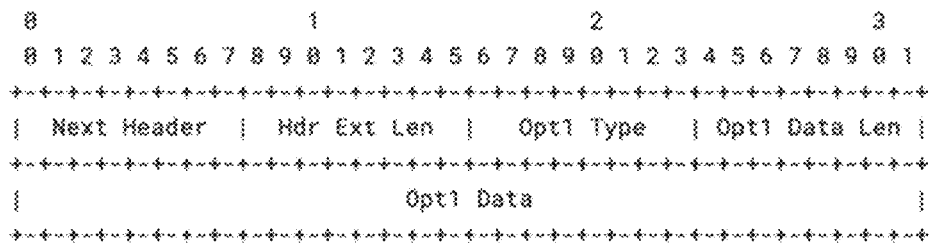
FIG. 26C illustrates IPv6 Hop-by-hop Extension Header structure.

A total size of 32 bits is used for the policy mark, in some embodiments. A total of 40 bytes can be packaged into IPv4 options, including option type and length fields. In IPV6 form, a Hop-by-Hop Extension Header can be used to transport the same option data. IPv4 Options and IPv6 Extension Headers have different initial overhead and alignment requirements. Using 32 bits for the policy mark fits well within the alignment requirements for both IPv4 and IPv6, aligning to a total of 8 octets in both cases. FIG. 26B illustrates an example of an IPV4 Options structure. FIG. 26C illustrates IPV6 Hop-by-hop Extension Header structure.

IP options are carried with each transmitted IP packet. With the policy information carried directly in each IP packet, the need for the Linux firewall mark is removed as well as for the Geneve encapsulation, as IP options are available for network processing on local hosts and also persist with the traffic as it traverses the network.

IP options can also be set using lower privileges than the CAP_NET_ADMIN privilege required for setting SO_MARK. Options such as timestamps can be set without any elevated privileges. Setting arbitrary options, in some embodiments, uses the CAP_NET_RAW privilege, but not the higher CAP_NET_ADMIN privilege.

Rather than using IP rules that direct traffic to Recast Edge POPs by mapping the policy mark to a routing table, policy IDs can encoded instead into IPv6 prefixes, which are referred to herein as "policy prefixes."

Recast Edge policy IDs are 16-bit identifiers in various embodiments. A Policy Prefix can be used to represent the policy ID as an IPV6 address. A fixed 112-bit IPv6 prefix can be combined with the 16-bit policy ID to create a 128-bit IPv6 address to present the policy, with the policy ID mapped to the last 16 bits of the IPV6 address.

The prefix fdfd::/112 from the Unique Local Address (ULA) range is selected as the policy prefix range. An example policy ID of 0x7841 would be represented by the policy prefix fdfd::7841/128.

Policy prefixes can be represented in regular IPv6 routing tables, permitting nodes to advertise their ability to process traffic for a given policy ID by advertising its policy prefix.

Gateway nodes use eBPF to retrieve the policy mark from the IP options carried directly in packets. The extracted policy is converted to its corresponding policy prefix via a fixed approach (e.g., embedding the policy ID within a base IPv6 prefix). A regular routing table lookup is performed from within eBPF on this policy prefix, and the packet is routed to the Recast Edge POP advertising the policy prefix. This:

Eliminates 32-bit policy constraint imposed by the use of the Linux firewall mark.

Removes the need to patch the Linux kernel to permit route lookups carrying firewall marks from within eBPF code.

Removes the need for the CAP_NET_ADMIN elevated capability on clients, using the less privileged CAP_NET_RAW capability.

The implementation of a "policy prefix" to draw traffic to a Recast Edge POP also simplifies the failover configuration for policies, as failover can be achieved by means of regular routing without the need to manipulate a routing table per egress location. This also overcomes a potential limitation of how to signal liveness of an overall Recast Edge location; if multiple egress prefixes are serviced from a single egress site, such as with a "spoke" site with a remote ISP transiting through a "hub" site, some embodiments might be unable to consider the connectivity of those multiple prefixes independently of each other. The "policy prefix" implementation is able to provide connectivity information on each egress prefix independently, and also to signal upstream connectivity separately between IPv4 and IPv6.

Figure 27:
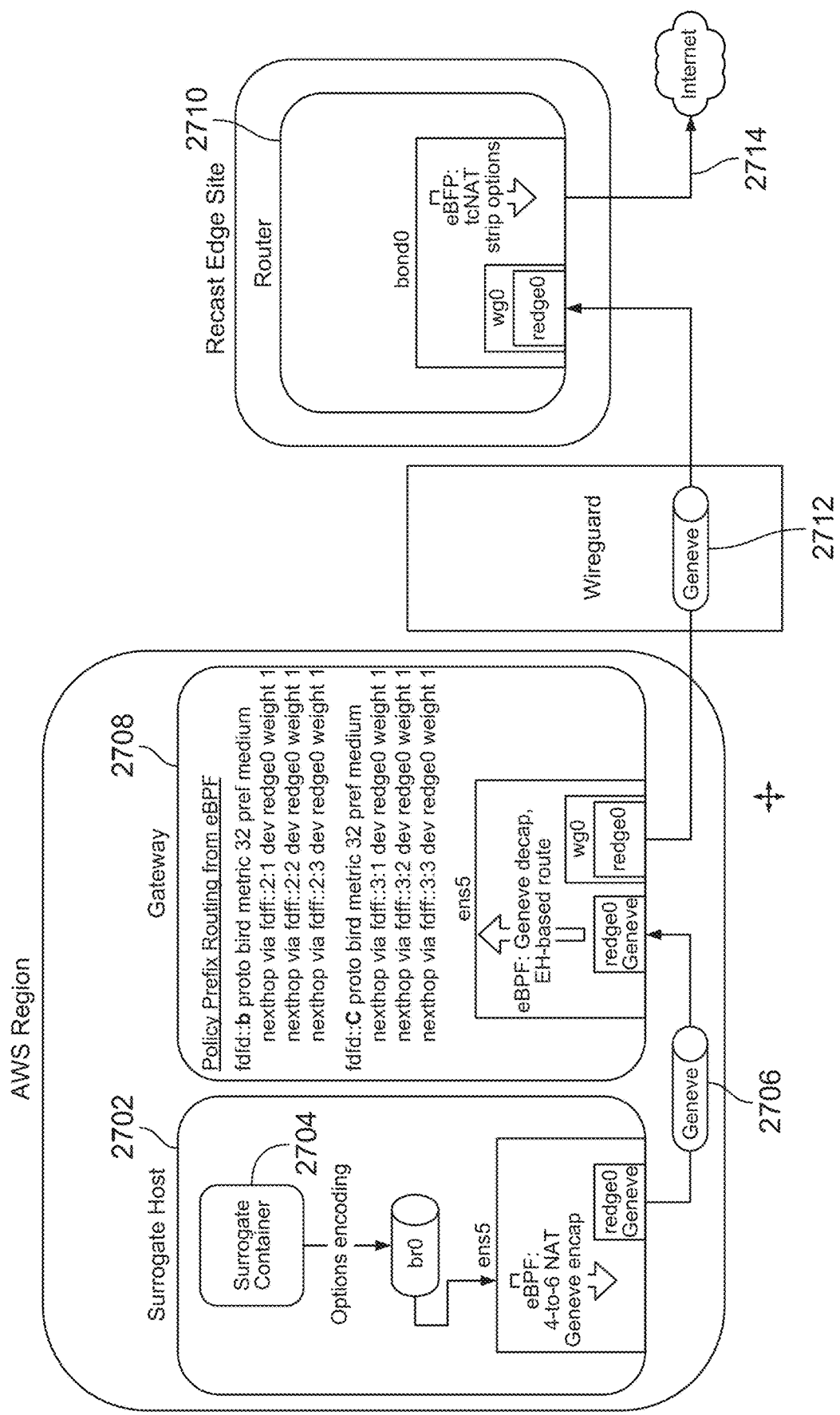
FIG. 27 illustrates example architecture for providing edge networks for surrogate browsing.

FIG. 27 illustrates example architecture for providing edge networks for surrogate browsing. With the 32-bit signaling limitation of the Linux firewall mark eliminated, the structure of the policy mark is also adjusted. Various components and functionality provided by those components will now be described.

Surrogate Container

One component included is surrogate container 2704. The surrogate container:

Applies a policy mark or any other signaling to its traffic.

Ensures that MTU on the traffic is adjusted to not exceed the MTU of any portion of the Recast Edge network.

Transmits the traffic to the surrogate host.

Policy Mark and other Signaling

The client IPv4 payload is translated to IPv6 for transport through the Recast Edge network, which supports disambiguation of overlapping IPv4 client networks. This function is performed on surrogate host 2702, not in surrogate container 2704, so the surrogate container speaks only IPv4.

The policy mark is encoded by the surrogate container in IPv4 options. IP option 0x7e is assigned to the policy mark and recorded in the IP Options Registry. This option-based encoding scheme also supports encoding additional information into the transmitted traffic. For instance, option number 0x7c has been reserved in the IP Options Registry to support a flow tracing use case. A Recast Edge client such as a surrogate container can encode any such registered options into client IP traffic.

MTU Control and Traffic Steering

In some embodiments, a Geneve tunnel interface 2706 is created between the surrogate container and surrogate host, to signal policy marks in Geneve TLVs. An alternate architecture shifts to using IP options to convey the policy mark, and Geneve is not needed between the surrogate container and surrogate host. A side effect of this is that the MTU clamping imposed by a Geneve tunnel interface between the container and host is not present, and the client MTU is restricted by different means.

A number of alternative solutions are available for controlling client MTU decisions. One example is use of the IP Type of Service (ToS) field in conjunction with IP routing rules to direct traffic into the Recast Edge network and inform the client application of needed MTU adjustment. A discrete routing table is created on the surrogate container. The default route in this table has the same next hop as the main routing table, which is via the bridge interface to the surrogate host. The default route in this discrete routing table does, however, have a reduced MTU applied. This ensures that the reduced MTU for traffic destined for Recast Edge is known by the networking stack directly at the initial routing decision, and packet sizing can be influenced accordingly.

Surrogate Host and Proxy Host

Both node types act as the initial ingress point to the Recast Edge platform that:
1. Performs IPv4 to IPv6 translation of client traffic to provide disambiguation of overlapping IPv4 addressing.
2. Encodes policy mark signaling into an IPV6 Hop-by-Hop Extension Header.
3. Directs traffic to a Recast Edge gateway (e.g., gateway 2708).

A surrogate host additionally needs to receive traffic from surrogate containers running on the host, which are received from the containers across a local bridge interface.

Described herein are examples of the functions performed by the proxies and surrogate hosts.

IPv4 to IPv6 Translation

Client traffic is translated from IPv4 to IPv6 when passed into Recast Edge infrastructure, by means of an eBPF program running on surrogate hosts and proxies. This translation step provides disambiguation between overlapping client IPv4 ranges, permitting Recast Edge to support clients with overlapping IPv4 address space, and also supports encoding the policy mark into an IPV6 Hop-by-Hop Extension Header.

Each Recast Edge Gateway AZ (AWS Availability Zone) is assigned a Recast Edge Zone ID (REZID). In some embodiments, it is a 16-bit identifier that is unique to a gateway AZ within a given deployment environment (dev, prod, etc.).

Proxies and surrogate hosts reside within a client VPC in AWS. Each client VPC peers with a Recast Edge gateway VPC deployed in the same region. The REZIDs for the peered Recast Edge gateway VPC are retrieved from a VPC catalog published by Recast Edge to S3.

A Recast Edge Gateway AZ has an IPV6 prefix allocated in the fd00::/80 network, in the form of fd00::<REZID>:0:0/96. Traffic destined for Recast Edge is translated by the surrogate host or proxy as follows, in various embodiments:

Destination IPv4 address: Translated to an IPV4-mapped IPv6 address. For example, destination IPv4 address 192.0.2.3 is translated to IPV6 address::ffff:192.0.2.3.

Source IPv4 address: Inserted into the Recast Edge Gateway AZ IPv6 prefix. For example, source IPv4 address 192.168.1.2 in REZID 0x8123 is translated to IPV6 address fd00::8123:192.168.1.2 (also expressed as fd00::8123:c0a8:0102).

A given Recast Edge gateway VPC cannot peer with client VPCs that have overlapping IPv4 space; this constraint is not imposed directly by surrogate browsing system 702, but by design and constraints of VPC peering within AWS. In the event there are overlapping client VPC IP ranges in a single region, Recast Edge provisions additional gateway VPCs in the region as needed, each with their own REZID, with the notion of Recast Edge Realms used to distinguish between the Recast Edge gateway VPCs.

This scheme disambiguates overlapping IP addresses by separating them into different IPv6 address spaces numbered by the REZID. An example client IP address 192.168.1.2 would be translated to fd00::8123:192.168.1.2 (fd00::8123:c0a8:0102) for a client in REZID 0x8123, but a different client with that same IP address connected through the Recast Edge gateway VPC with REZID 0x8540 would have a translated IPV6 address of fd00::8540:192.168.1.2 (fd00::8540: c0a8:0102).

Policy Mark and Other Signaling

The client, either on the proxy host directly or on the surrogate container in the case of an isolation session, encodes the policy mark or any other signaling into IPv4 options through a setsockopt operation. The surrogate host or proxy then transcodes the policy mark and any other known options from IPv4 options into an IPV6 Hop-by-hope Extension Header in the translated IPv6 packet.

Traffic Steering

IP routing rules are installed on proxies and surrogate hosts that match on the IP Type of Service (ToS) field with a value of 4 and direct the traffic to the Recast Edge gateways in the peered gateway VPC through a Geneve tunnel interface. The Recast Edge gateways in the peered VPC are bound to an AWS Network Load Balancer (NLB) listening on UDP port 6081, and the surrogate host or proxy sets the IP address of that NLB as the Geneve tunnel destination. The IP address of the NLB is retrieved from the VPC catalog published by Recast Edge to S3. In another implementation, the NLB component is removed altogether and traffic is sent directly from proxies and surrogate hosts to one of multiple available gateways. In this case, the catalog provides a comprehensive list of all possible gateways. Software running on the sending host (eBPF, userland agent) has the responsibility to select one of the available, healthy remaining gateways and to send the traffic its way. Along with ensuring that traffic is sent only to healthy next hops, it distributes traffic to achieve load-balancing. Multiple different load-balancing strategies can be implemented. For example, round-robin or by grouping packets of the same flow to the same gateway. In some embodiments, the end-hosts (proxy/surrogate) operate in an NLB-less mode. In that mode, the eBPF code running on an end-host (proxy/surrogate) is configured with the full list of available and healthy gateways and their IP addresses. This is the same set currently residing behind the NLB. This way it is able to perform direct routing of packets to the gateways, circumventing the NLB (and its associated cost). Load balancing is performed locally by the same eBPF code. This further allows for implementing different load-balancing strategies. It can be implemented as a hash of the 5 tuple (Protocol, source IP+port, destination IP+port) mod (%) the number of available configured (healthy) gateways as next hop. This keeps a given packet flow on the same outgoing gateway. An alternative approach is load-balancing on a per-packet basis. The mode of operation (NLB or NLB-less) is configurable and both methods of operation are supported.

An encapsulation protocol is needed between the client and the Recast Edge gateways because client VPCs support only IPv4, but the client traffic is carried within the Recast Edge platform as IPv6 and has been translated to IPv6 by this point in the traffic path. Geneve is an example of a technology that can be used as the encapsulation protocol for this function.

Receive Response Traffic, and IPv6 to IPv4 Translation

Response traffic is received from gateways (e.g., gateway 2708) encapsulated in Geneve. The surrogate host or proxy decapsulates this response traffic and receives the response in its IPv6 form. An eBPF program then reverses the IPv4 to IPv6 translation it performed on transmitted traffic. The IPV4 client traffic is then handed to the kernel. On proxies, the traffic will be received by the application. On surrogate hosts, the traffic will be transmitted across a local bridge interface to be received by the surrogate container, where it is then processed directly by the kernel without any further Recast Edge processing work.

Recast Edge Gateway

An example embodiment of a Recast Edge gateway (e.g., gateway 2708) performs the following functions:
1. Receives traffic from Recast Edge clients (proxies and surrogates) in peered VPCs.
2. Maintains connectivity to all Recast Edge Points of Presence (POPs).
3. Interprets the policy marks in client traffic, and directs client traffic to the appropriate Recast Edge POP based on the policy mark.

Receiving Client Traffic

A Recast Edge Gateway VPC is deployed into every AWS region where Recast Edge client VPCs are present. Because it is not possible to establish VPC peering between VPCs with overlapping IP space, a single gateway VPC cannot peer with client VPCs with overlapping IPv4 space within its service region. In cases where there are overlapping IPv4 client networks in a given region, additional gateway VPCs are deployed such that each client VPC is able to peer with a gateway VPC in its region. Recast Edge Realms are used to support this scenario of multiple gateway VPCs in a single region.

As described above, gateway nodes are bound to an AWS NLB to receive Geneve-encapsulated traffic from clients.

An eBPF program is attached to the Geneve interface on the gateway to decapsulate the traffic and receive it for further processing.

Connectivity to Edge POPs

Physical connectivity between Recast Edge Gateways, residing in cloud providers (e.g., AWS/GCP/Azure), and Recast Edge Routers, residing in edge providers (e.g., Equinix Metal/Zenlayer), can be implemented in various ways. One approach is to route traffic over the public Internet. An alternate approach is to use a dedicated physical link (such as fibre) between the two ends while leveraging services like AWS Direct Connect. Each solution has its pros and cons such as: cost, technical implementation complexity, third-party dependencies. Suggested architectures remain valid regardless of the underlying physical medium and method of traffic transportation.

Recast Edge gateways establish Wireguard connections to every Recast Edge router (e.g., router 2710) in their deployment environment. In shifting to carrying the policy mark within an IPV6 Extension Header directly, rather than within a Geneve TLV field, it is possible to carry traffic between gateways and routers directly over Wireguard, without a second encapsulation layer (Geneve), though the second layer can be used in various embodiments.

In some embodiments, only a single Geneve interface is configured on each gateway and router host, that provides connectivity to all needed other destination hosts in the Recast Edge platform.

BGP sessions are established between each gateway and each router in a deployment environment. Each gateway exports its REZID-derived IPv6 prefix (fd00::<REZID>:0:0/96). When there are multiple gateway instances in a given AWS AZ, they all export the same REZID-derived IPv6 prefix, as the RE.ZIP is assigned to an AZ. In this way, all of the gateways in an AZ become valid and equal cost next hops for routers to reach the AZ's IPv6 prefix, and return traffic from routers to gateways is balanced across gateways via Equal Cost Multi-Path (ECMP) routing.

Recast Edge routers export to gateways a Policy Prefix for each policy ID they are currently responsible for routing and processing.

Traffic Steering

Gateways install the policy prefixes received from routers into their kernel routing tables. All routers in a given Recast Edge POP advertise the policy prefixes being processed by that POP, so that traffic from gateways for a given policy prefix is load balanced via ECMP routing across the routers in the responsible POP.

An eBPF program on gateways reads the policy ID encoded into the IPV6 Hop-by-hop Extension Header for traffic received from gateways. The gateways perform a routing table lookup for the policy prefix of the parsed policy ID, from within eBPF. The gateways then route the client traffic through their Geneve tunnel interface to one of the routers that are advertising the policy prefix for the traffic's indicated policy ID.

Traffic between gateways and routers is first encapsulated in a Wireguard encryption layer before being transmitted through the Geneve interface, as pictured in FIG. 27. In other words: the Geneve traffic is "inside" the Wireguard tunnel (2712).

Route Return Traffic Back to Clients

Reply traffic from the public Internet that is directed by routers back to gateways is routed by the gateways back to the originating client by an eBPF program. The traffic returning from the public Internet through routers will be IPv4-to-IPv6 translated by routers, so the destination address on the return traffic will be an unambiguous IPV6 address of the client. Disambiguation can be performed via the REZID which has been stored in the NAT state associated with the traffic flow when the NAT state was originally created by the traffic on its way out.

The IPV6 destination address of the response traffic contains the client's IPV4 address within it. The eBPF program running on the gateway extracts the client's IPV4 address from this IPv6 destination address. The client traffic is then encapsulated in Geneve, with the extracted client IPv4 address set as the destination address on the outer Geneve packet.

Recast Edge Router

Recast Edge routers (e.g., router 2710) are responsible for the following tasks:
1. Maintaining connectivity to Recast Edge gateways.
2. Receiving traffic from Recast Edge gateways.
3. Performing source NAT on client traffic, according to the indicated policy ID.
4. Routing client traffic to the public Internet.

5. Receiving response traffic for client-initiated traffic, and reversing the source NAT applied to that flow.
6. Routing traffic back to the Recast Edge Gateways responsible for the client traffic.

Connectivity to Recast Edge Gateways

This is the other end of the Wireguard overlay between gateways and routers. Recast Edge routers establish Wireguard connections to every Recast Edge gateway in their deployment environment and then establish BGP sessions across Geneve tunnels to those gateway nodes. A single Geneve tunnel interface is configured on each gateway and router host.

Routers advertise policy prefixes to gateways across the BGP sessions between gateways and routers, and gateways advertise their REZID-derived IPv6 prefix.

Recast Edge routers maintain an association between their upstream connectivity and the export status of corresponding policy prefixes. When a router loses upstream connectivity, it will stop advertising associated policy prefixes to gateways so that gateways do not forward it traffic that it is unable to route further to the public Internet. While the Recast Edge platform is initially only scoped to carry IPv4 client traffic, this coupling is maintained per address family to permit routers to withdraw policy prefixes independently for IPV4 and IPv6.

Receiving Client Traffic

Client traffic is received from gateways across routers' Geneve interfaces. An eBPF program is attached to the Geneve interface on the router to decapsulate the traffic and receive it for further processing.

Source NAT

A second eBPF program on the routers extracts the policy ID from the IPV6 Hop-by-hop Extension Header in the client's IPV6 packet. The routers maintain a mapping of policy IDs to corresponding IPv4 prefixes. The eBPF program translates the IPV6 form of the client's traffic back to IPv4, but also performs source NAT to replace the client's IPv4 source address in the packet with an address from the prefix associated with the indicated policy ID. The consistency ID in the policy mark is used to ensure that all packets for a given policy ID marked with a given consistency ID will be translated to the same source NAT IP address. Use of consistency identifiers (and thus IP stickiness) addresses a problem where some destination websites might provide a bad user experience if multiple web requests from the same user identified by a single web session (e.g., a session cookie) come from different source IP addresses. Some web sites might associate the web session identifier with a single source IP address (the one used during authentication) and thus invalidate the requests coming from different IPs. Without Recast, such requests issued by surrogate browsing system 702's proxies could come from different source IP addresses. An optional tenant identifier can also be used for identification and attribution of traffic to a given customer of surrogate browsing system 702.

Once a given flow or connection has been seen by the eBPF NAT program, an entry is created in a source NAT connection table, containing the packet's:

Policy mark.
REZID.
Pre-NAT IPv4 source address and port.
Post-NAT IPv4 source address and port.
IPv4 destination address and port.

Subsequent packets in the same flow are matched by the eBPF NAT program to its connection table entry and have the same NAT process applied.

The eBPF NAT program is scaled horizontally across >1 routers at each given Recast Edge POP, and the source NAT connection table is synchronized between the routers in a POP across a control network by a userspace program. Thus, all routers in a given POP are able to perform source NAT functions for all active flows in that POP, regardless of which router was the first to receive traffic for a given flow.

Route to Public Internet

Once client traffic has source NAT applied onto a public prefix, the traffic is routed to the public Internet (2714).

Recast Edge policy IDs are associated to a given egress ISP at a Recast Edge POP. Recast Edge POPs have at least one egress Internet Service Provider (ISP), but may opt to support a "hub and spoke" model, with remote ISPs connected through a central physical facility in some regions. Routers maintain a discrete kernel routing table for each egress ISP connected to their POP, with the policy ID for traffic being mapped to the selected egress ISP, and client traffic directed to the corresponding ISP routing table for egress to the public Internet.

Receive Response Traffic and Reverse Source NAT

In order for response traffic to be routed back to the Recast Edge POP responsible for handling traffic for the source NAT prefix, routers advertise that prefix to the public Internet. Recast Edge routers advertise the prefixes they are responsible for to the egress ISPs those prefixes are mapped to. For instance, if a Recast Edge POP is designated to process traffic for the prefix 192.0.2.0/24 via ISP A and 198.51.100.0/24 via ISP B, routers in that POP will all advertise 192.0.2.0/24 to their ISP A transit router peers and 198.51.100.0/24 to their ISP B transit router peers. Traffic from the public Internet destined for 192.0.2.0/24 will then reach the POP through ISP A, and traffic destined for 198.51.100.0/24 will reach the POP through ISP B.

When Recast Edge POP routers receive traffic from the public Internet, an eBPF program evaluates the traffic to check that it:

1. Is destined for a valid Recast Edge prefix.
2. Is part of existing client flow, i.e., that a source NAT connection entry is present for it.

Traffic that does not meet those criteria is passed to the kernel for regular processing, which generally would mean that it should be discarded.

Traffic that does meet the criteria is translated back according to its corresponding source NAT connection entry, as follows, in some embodiments:

1. The traffic is translated from IPv4 to IPV6.
2. The source IPv4 address is translated to an IPV4-mapped IPv6 address, e.g., source IPv4 address 192.0.2.3 is translated to IPV6 address ::ffff:192.0.2.3.
3. The destination IPv4 address is combined with the client REZID and IPV4 address, retrieved from the NAT connection table, to create the client IP address. A NAT connection entry with a client IP address of 192.168.1.2 in REZID 0x8123 is translated to IPv6 address fd00::8123:192.168.1.2 (also expressed as fd00::8123:c0a8:0102).

Route Response Traffic to Clients

With the source NAT for the response traffic translated back to its IPV6 form, the traffic is routed back to a gateway in the appropriate REZID. As gateways advertise their REZID-derived IPv6 prefix to routers, the routers have multiple equal cost paths available to the client's gateway VPC, equal to the number of gateways running within that AZ. This traffic is carried across Geneve inside of the outer Wireguard encrypted path between routers and gateways.

D. Additional Information
1. Scope of IPv4 Options and IPv6 Extension Headers

IPv4 traffic carrying even standard options are frequently discarded on the public Internet, as are IPv6 packets with Extension Headers. Transmitting IP packets carrying IPv4 Options or IPv6 Extension Headers onto the public Internet significantly reduces the likelihood of successful delivery of that traffic. Accordingly, in various embodiments, usage of IPV4 Options and IPv6 Extension Headers is restricted to internal usage by surrogate browsing system 702. Any IPv4 Options or IPv6 Headers added to traffic by Recast Edge are removed from the traffic before itis transmitted in native form to any external networks.

Recast Edge traffic that is marked by IPv4 Options or IPv6 Extension Headers will traverse the public Internet in paths between Recast Edge components, specifically between Recast Edge Gateways and Routers. However, in those cases the traffic will be encapsulated inside an outer IP header, for example, a Wireguard encryption header (and/or a Geneve header, as applicable). Any IPv4 Options or IPv6 Extension Headers are thus obfuscated and not visible to any nodes traversed outside of the Recast Edge network while the traffic is encapsulated.

2. Example Packet Flow and Operations

First Version

Figure 28:
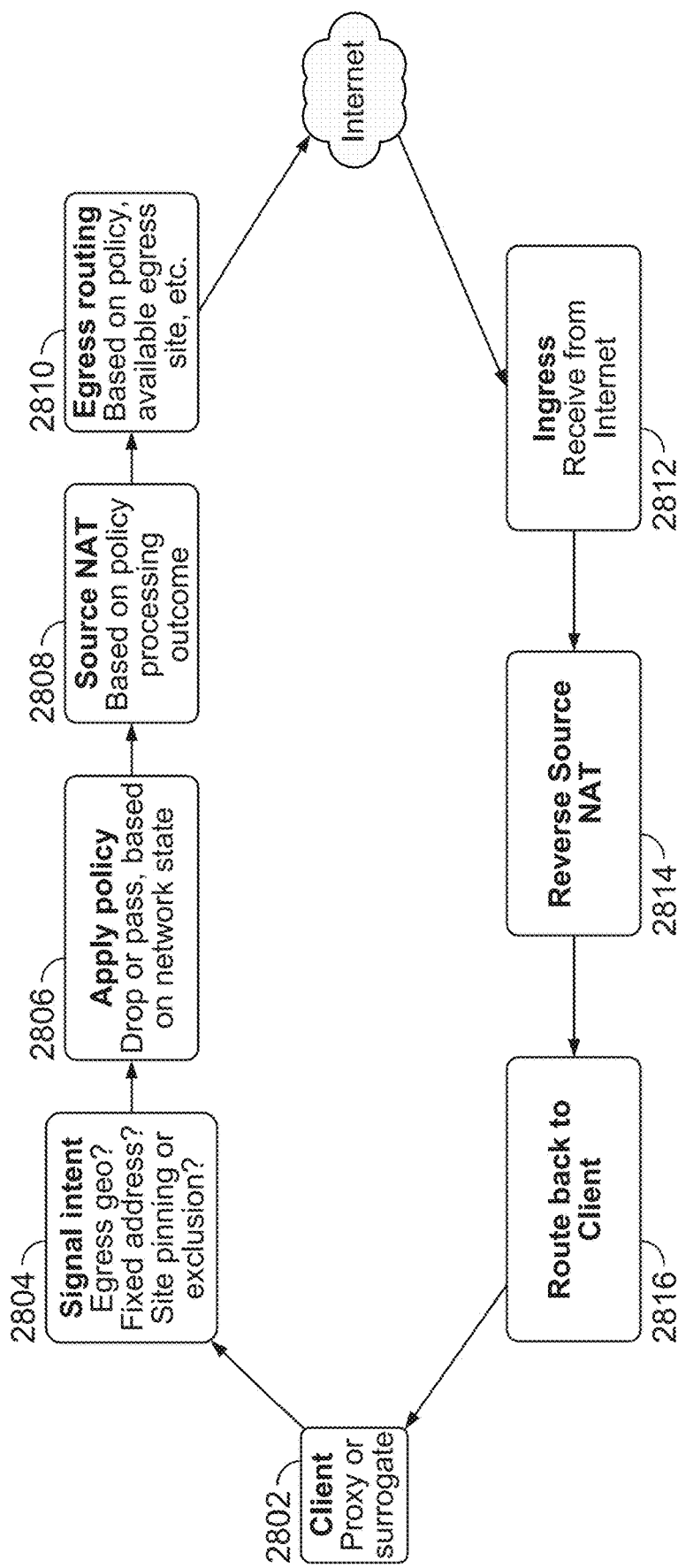
FIG. 28 illustrates example packet flow and operations through an embodiment

At a high level, example packet flow and operations through an embodiment of Recast Edge are shown in FIG. 28. Base functionality includes:

Client (proxy or surrogate container) 2802 signals policy/egress intention (2804) to Recast Edge.

Policy is enforced (dropped/passed/other) at 2806 and the packet is routed accordingly to the appropriate edge PoP. Traffic originating from a surrogate browser (isolated in a container) is subject to filtering as soon as it reaches the surrogate host (but before it leaves it). Filtering at this step ensures that the tenant running inside the container is only allowed to request routing policies (and others) that it is permitted to. For example, this prevents tenant A from requesting a routing policy X which is dedicated to tenant B and is meant to provide fixed egress IP addresses only to tenant B. Another example would be restricting the egress edge POPs that a given tenant is allowed to access based on geo-political restrictions. Filtering at the surrogate host level maintains the assumption of not trusting traffic originated from within a surrogate container.

Source NAT is applied, based on policy specification (2808).

Egress routing occurs, based on policy specification (2810).

Traffic returns from public Internet to Recast Edge (2812).

Source NAT is reversed (2814).

After source NAT is reversed, sufficient data exists to disambiguate client unique location (REZID) in case or overlapping IPv4 space (discrete REDGE realms)

Response is routed back to client (2616).

An example execution is as follows. As explained above, the client sets a firewall mark ("fwmark") on the socket it uses to transmit its data. This sets the fwmark on all data sent through this socket, in accordance with the Recase Edge Policy Routing Marker Format. This fwmark is carried along with the SKB and transports the policy mark through the local host, in a method accessible to the kernel and, e.g., local eBPF programs.

At the host network boundary, the policy mark is extracted from the fwmark and encoded into a custom TLV inside Geneve encapsulation. This transports the policy mark between network hosts. At the receiving host (Geneve decapsulating host), the TLV is extracted and then encoded again into the fwmark in order to be available to the kernel and local eBPF programs.

The original IPv4 request Is translated Into IPv6 by the client (proxy or surrogate host, not by the surrogate container itself). The source IPv6 address encodes the REZID into the address, into the /96 prefix allocated lo that AZ (REZID) out of the covering fd00::/80 for Recast Edge VPCs. This IPv6-mapped address is then globally unique across Recast Edge, including across Recast Edge Realms, and disambiguates overlapping IPv4 source addresses across Recast Edge realms.

In this scheme, the original destination IPv4 address is mapped into the standard IPv6-mapped IPv4 address range, i.e., ::ffff:0:0/96. For example, the destination IP address 192.0.2.10 would be rewritten to ::ffff:192.0.2.10.

Routing of the client traffic to a given Recast Edge POP is based on the policy ID as read from the fwmark on a given packet. A routing table (FIB) lookup occurs from within the tcgeneve eBPF code on the gateways. IP(6) rules are created on each gateway, with a rule created for each policy mark (only the policy ID portion, with a mask over the consistency ID portion). The rules direct the FIB lookup into a discrete routing table, with a routing table per Recast Edge POP. Each Recast Edge POP exports only a single default route IPv6 prefix (::/0), such that any traffic directed into that REDGE POP's routing table on a given gateway are directed to the active routers at that Recast Edge POP.

The routers at the Recast Edge POPs need to signal their availability to downstream gateways by exporting an IPV6 default route (::/0) over BGP, even though the actual traffic will end up egressing via IPv4. In some embodiments, the routers receive both an IPV4 and IPv6 default route from their upstream transit provider(s), and export the IPV6 default route down to gateways. Here, IPv6 Internet connectivity is used to signal IPv4 Internet connectivity, even though the routers could have their IPV6 transit connections up but their IPv4 transit connectivity down. This can be addressed through a "transit manager," where such a transit manager has: awareness of overall connectivity state or health of each Recast Edge POP; awareness of the upstream connectivity state of each Recast Edge router, for both IPv4 and IPV6 separately; awareness of the connectivity between Recast Edge gateways and routers; the ability to influence routing decisions on gateways to control the egress path on a per-policy level; and the ability to control the public Internet advertisement of source NAT prefixes on all Recast Edge routers.

Second Version

On the Client (Surrogate or Proxy)

The process starts with a client (e.g., running in region us-west-la of a cloud provider) opening a regular IPv4 socket to a destination it wants to connect to. An example socket 5-tuple is: protocol: TCP; source IP: 10.0.0.1, source port: 12345; destination IP: 1.2.3.4, destination port: 80. In short notation: IPv4 TCP 10.0.0.1:12345->1.2.3.4:80.

After consulting its configuration it determines that it needs to egress this particular traffic via a particular edge site, for example, London. It now knows the policy identifier associated with that requested edge site (e.g., the policy identifier is: 0xab12).

A consistency identifier for this socket (flow of packets) is calculated. This can be determined by a variety of approaches as long as it stays the same for this browsing session. An example approach is crc16 over the browser's source IP+tenant id+browser user agent (e.g., a consistency identifier of: 0x0099).

Client applies the policy routing marker (policy identifier+consistency identifier) using the IPv4 header option on this socket. All outgoing packets are now going to carry this option for this socket. Additional information (e.g., that could be applicable and supported) is also applied at this point via IP header options. For example, setting the tenant identifier of the customer that this session belongs to.

In order to redirect those packets into the Recast Edge overlay network, the client sets an appropriate TOS (e.g., 4) to the socket. This is a standard BSD socket operation. Such packets are further matched by IP rules which direct the traffic to the geneve interface where an eBPF program runs. Alternative approaches for traffic steering could include a fixed firewall mark value.

In the case of this client being a surrogate container the packet is forwarded to the surrogate host first. There, a filter running on the bridge interface, in the form of an eBPF program, ensures that the client has requested a policy identifier that this tenant identifier is in fact permitted for use.

The packet is now processed by an eBPF program running on the Geneve (or other encapsulation type) interface of the client (surrogate host or proxy). This eBPF program performs the following functions:

- it converts the original IPv4 packet into an IPV6 packet including the header options. In essence, it performs stateless NAT46. It does so while taking into account its configuration of REZID. The packet is converted from IPV4 TCP 10.0.0.1:12345->1.2.3.4:80 to IPV6 TCP [fd00::8001:10.0.0.1]: 12345->[::ffff::1.2.3.4]:80. In this case, the REZID is 0x8001. UDP and ICMP protocols are supported in a similar fashion.
- the IPV6 packet is forwarded over the Geneve overlay to a Recast gateway. The gateway could be further behind a Network Load Balancer or a list of gateways might be available for the eBPF program to choose from and balance the traffic to directly, as applicable.

On the Recast Edge Gateway

- policy identifier (0xab12) is extracted from the IPV6 headers
- a custom policy prefix is constructed-fdfd::ab12/128
- routing table (FIB) query is performed for policy prefix fdfd::ab12/128
- a route to fdfd::ab12/128 from one or more routers capable of serving the 0xab12 policy identifier is expected to be present in the routing table. Those routes are populated by means of dynamic routing such as BGP
- an IPV6 address for one of the routers is returned from this lookup. Those IPv6 addresses correspond to Geneve interface on top of Wireguard encapsulation
- packet is forwarded accordingly over the Wireguard+Geneve overlay which connects the two sites. Physical connectivity might be over the Internet or private direct lines On the Recast Edge Router (at an Edge Site)

- packet arrives at the chosen router at the edge location as requested by policy 0xab12
- using the policy identifier and consistency identifier combination (policy routing marker) still present in the header options the router selects an appropriate IPv4 address to be used as the new NAT source IPv4 address. This is done through a lookup in a configuration table mapping policy routing markers to egress IPv4 NAT addresses. For example, policy routing marker 0xab120099->147.28.0.1
- a new available source port is picked (e.g., 45678)
- all IP options are stripped from the header; Wireguard and Geneve encapsulation is also removed
- the packet is converted from IPV6 TCP [fd00::8001: 10.0.0.1]: 12345->[::ffff::1.2.3.4]:80 to IPv4 TCP 147.28.0.1:45678->1.2.3.4:80
- a corresponding NAT state table entry is created and all the details of this session, including the original packet addresses and REZID are stored in it
- if this corresponds to a state change (for example SYN+ACK->ESTABLISHED) a synchronization packet is sent out to all routers participating in the cluster so that each of them is then capable of serving subsequent packets if the current router goes away or if the return packet lands on a different router (asymmetric traffic)
- packet is forwarded out to the Internet to its originally intended destination of 1.2.3.4:80
- all of the above is performed by a combination of a custom eBPF program and a userland agent Return Traffic

- return traffic is handled in a similar way but in reverse
- when return packets arrive at the router an IPv4 packet from the Internet is converted to the IPV6 packet that created the state in the first place
- using the REZID which was stored in the state table, a custom lookup is performed for fd00::8001/96, where fd00::REZID/96 are prefixes advertised by gateways responsible for serving REZID 0x8001. Such prefixes are again populated in the routing table by means of dynamic routing such as BGP. The packet is forwarded over the Wireguard+Geneve overlay to the selected gateway accordingly
- back at the gateway the packet is forwarded to the originating host 10.0.0.1 which IP address is extracted from the IPV6 address and forwarded in Geneve encapsulation
- back at the originating client, the returning IPv6 packet is converted to an IPV4 packet that the host kernel and application will recognize as part of the same socket/packet flow. All IP options are stripped
- the packet is delivered to the original application 3. MTU Optimization By shifting policy signaling from Geneve encapsulation TLVs into IP options, the transport solution does not need an encapsulation protocol to carry TLV data. This allows for the removal Geneve encapsulation between surrogate containers and surrogate hosts.

Network Model for Geneve Tunnels

In some embodiments, Geneve tunnels are not configured as point-to-point, but instead are configured as "externally managed." This means that the tunnel interfaces do not have a tunnel destination address configured, and an external method is used to set the tunnel destination to "finalize" the tunnel by adding the tunnel destination IP address for the relevant traffic. In surrogate browsing system 702, that external tunnel "finalization" is performed by an eBPF program. This permits the surrogate browsing system 702 to configure only a single Geneve tunnel interface on each host, and to treat that Geneve interface as being attached to a single "flat" network (single subnet) that is connected to every other Geneve host in the platform as needed.

4. Options Encoding Format

IPv4 options and IPv6 Hop-by-Hop Extension Headers have specific semantics which require due diligence on how signaling is encoded within packet headers. Embodiments described herein have been limited to traffic contained within the environment of surrogate browsing system 702, the option to diverge from IPv4 and IPv6 protocols specifications as needed can be used.

IPv6 Extension Header Usage

IPv6 uses a fixed 40-byte header, with an 8-bit "next header" specifier in the header. This "next header" field refers to IANA-allocated IP protocols, specifically a subset of IP protocols that are called out as IPv6 Extension Headers. Each extension header is a multiple of 8 octets long, with padding required in cases in order to fill the option to a multiple of 8 octets in length.

Comparison to IPv4 Options

Figure 26D:
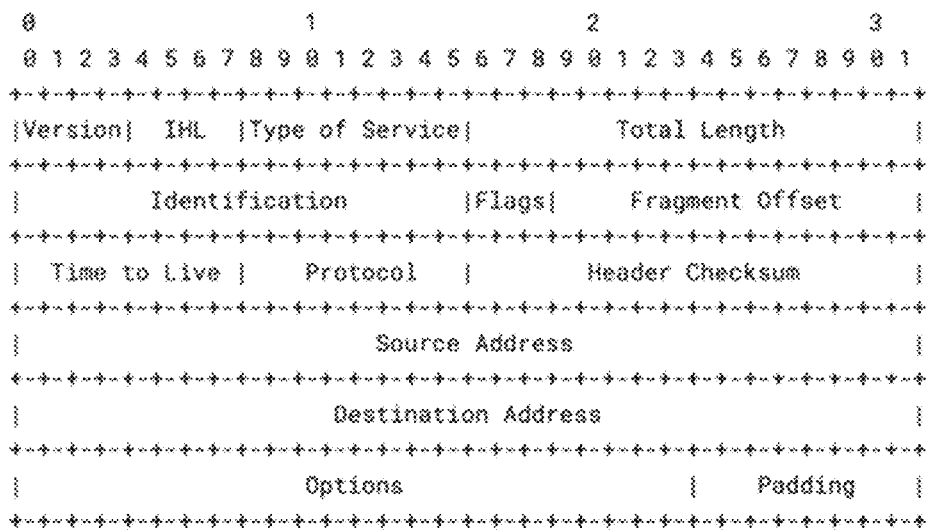
FIG. 26D illustrates the layout of an IPV4 header.
Figure 26E:
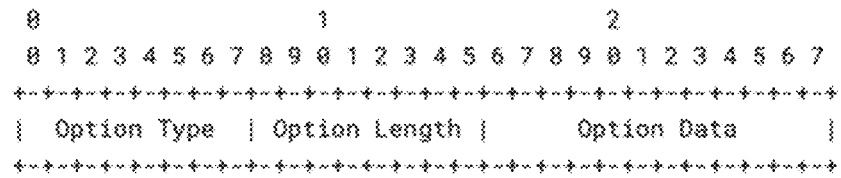
FIG. 26E illustrates encoding of individual options.

In IPv4, the options are embedded directly to the end of the IPV4 header as individual options with 2 bytes of boilerplate fields per option, and then variable length data for each option. The total IPv4 header length must be some multiple of 32 bits (4 bytes). The overall IPv4 header is laid out as shown in FIG. 26D. Individual options are encoded as shown in FIG. 26E, in an example of an option with 12 bits of data. Together with the 8-bit length field, there are 16 bits of fixed overhead per option. With 12 bits of option data thus forms an options header that is 28-bits long. If this were the only option in the header, the IPV4 header would need to be padded with an additional 4 bits to ensure the IPV4 header lands on a multiple of 32 bits.

IPv6 Extension Headers follow a different convention. Each Extension Header includes a "Next Header" field indicating the IP protocol number of the next header in the "header stack," and an IP protocol header stack is created. If an IPV6 packet is transmitted with a TCP payload and a Hop-by-Hop Extension Header, the following would be an example "header stack":

| HEADER | "NEXT PROTOCOL" Field Value |
|---|---|
| Fixed (outer) IPv6 header | Hop-by-hop Extension Header: IP protocol 0 |
| Hop-by-hop Extension Header | TCP: IP protocol 6 |

Both the Hop-by-Hop and Destination Extension Header types support writing multiple discrete options into the Extension Header. Effectively, multiple, discrete IPv4 options can be written as options into a single Hop-by-hop or Destination Extension Header. RFC8200 does also explicitly indicate support for combining multiple option data fields into a single option. For example, it is acceptable to craft a single option that contains two separate 2-byte option data fields, one 4-byte and one 8-byte data field, etc.

Extension Header Type

In some embodiments, a custom Extension Header "type" is created, for example using either or both of IP protocol number 253 and 254, which are reserved for experimentation and testing. However, both the Hop-by-Hop and Destination Extension Header types also provide functionality, with support for custom TLV data.

Hop-by-Hop Extension Header Format

Figure 26F:
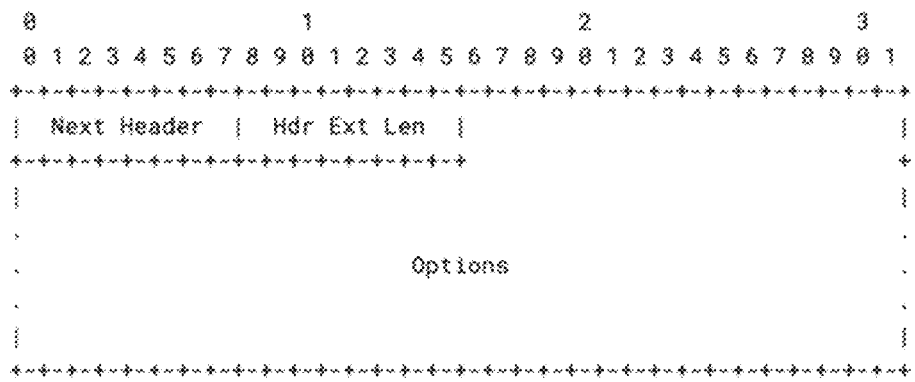
FIG. 26F illustrates the structure of a Hop-by-hop Extension Header.

The Hop-by-hop Extension Header carries the overall structure illustrated in FIG. 26F. The Next Header and Header Extension Length fields are both 8 bits wide for a fixed overhead of 16 bits per Extension Header.

Figure 26G:
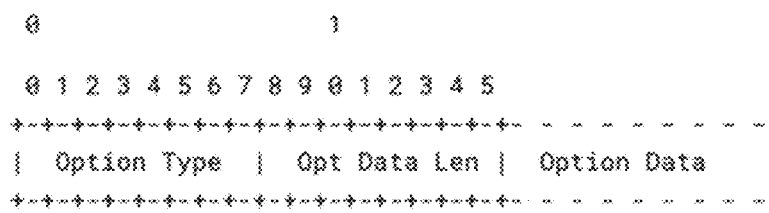
FIG. 26G illustrates the Options fields in a Hop-by-hop or Destination Options header.

The Options fields in a Hop-by-Hop or Destination Options header are encoded as shown in FIG. 26G. Option Type and Option Data Length are both 8 bits wide. Thus, each additional option added to the hop-by-hop extension header carries 16 bits of overhead. The Option Data field is of variable length, but is padded such that the full hop-by-hop extension header is a multiple of 8 octets long.

IPv4 Options Vs. IPv6 Hop-by-Hop Extension Header Overhead

IPv4 options carry 16 bits (2 octets) of fixed overhead per option. Defined options within an IPv4 header must align to 32-bits, so the full header must be padded to a multiple of 4 octets. The IPV6 Hop-by-hop Extension Header carries 16 bits of fixed overhead for the Extension Header itself, and 16 bits of fixed overhead per option. Each extension header is a multiple of 8 octets, and is padded out as needed to a multiple of 8 octets.

The minimum extra header space required when using IPv4 options is 32 bits (4 octets), with 16 bits available for user-specified options data. The minimum extra header space required when using the IPV6 Hop-by-Hop Extension Header is 64 bits (8 octets), with 32 bits (4 octets) of that available for user-specified options data.

Both examples assume a single option type is used.

Encoding within IPv4 Options and IPv6 Hop-by-Hop Extension Headers

Figure 26H:
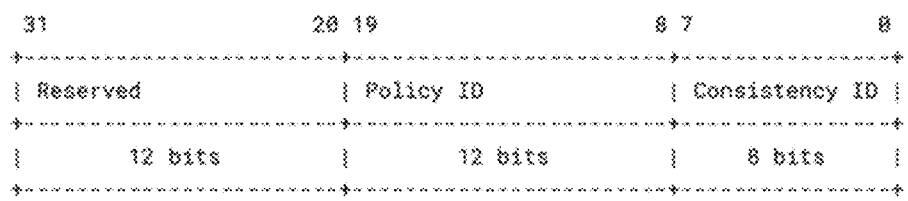
FIG. 26H illustrates an encoding scheme.

Recast Edge policy in an example implementation carries 32 bits, aligning to the 32-bit bounds of the Linux firewall mark, encoded as shown in FIG. 26H. In the most compact form, the 12-bit reserved field is omitted. This carries 20 bits of significant data and fits exactly within the 32 bits of user-specified data available in the first 8 octets of IPv6 Hop-by-hop Extension header encoding, but exceeds the 16 bits of user-specified data available within the first 32-bit of options space in the IPV4 case. There are two ways to pack 32 bits of user data in to the IPv4 Options encoding:

1. Extend the options field into the next 32 bits of space, for 64 bits of options space overall and 48 bits of user-supplied options data. This approach is portable and follows the IPv4 specification, at the cost of an extra 4 octets of header space in IPv4 transport.
2. Omit the 8-bit length field from the options header, using a fixed length option, assuming that fixed option length based on option number. This approach is more compact and cannot be processed by any IPv4 hosts that are not explicitly configured to understand it. This approach is nonetheless safe to use, as the IPV4 traffic will only ever be processed by hosts under control of surrogate browsing system 702/running custom eBPF software.

Figure 26I:
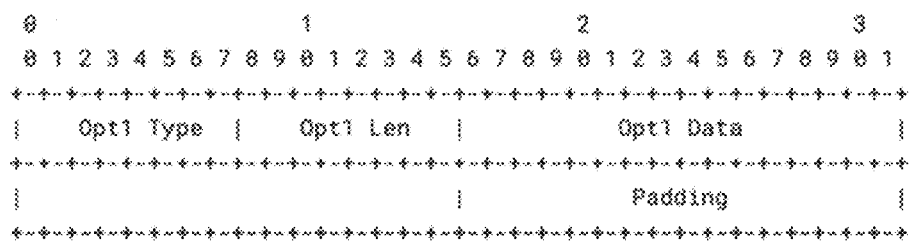
FIG. 26I illustrates an IPV4 Options structure.

Incurring an extra 32 bits of options header overhead for IPV4 transport results in an IPv4 Options structure as illustrated in FIG. 26I and the IPV6 Hop-by-hop Extension Header structure illustrated in FIG. 26J.

Single or Multiple Options

With options-based encoding, an election can be made of either encoding each discrete piece of signaled data in a separate option, or combining multiple (or all) pieces of communicated data into a single "mega option" that must be parsed as discrete pieces of information through a fixed protocol specification. In both the IPV4 and IPV6 cases, each additional discrete option carries 2 octets of overhead, to encode the required Option Type and Option Length octets. In the IPV4 case, there may exist sufficient room to encode Policy ID and Consistency IDs into discrete options, as Options 1 and 2, respectively, as illustrated in FIG. 26K. Note that the Policy ID is extended here from 12 bits to 16 bits in order to align to an octet boundary. The extra 16 bits of Extension Header overhead in the IPV6 case, however, would result in this structure bleeding over the initial 64-bit boundary. As the length of IPV6 Extension Headers must be multiples of 8 octets, an additional 8 octets of overhead are incurred, with that overhead being mostly empty padding, as illustrated in FIG. 26L. As such, it can be beneficial to use a single option for the policy mark, composed of the combined policy ID and consistency ID.

Updated Policy Mark

In some embodiments, a single piece of control data: a 32-bit policy mark that maps to the Linux firewall mark is transported. This includes: a Consistency ID of 8 bits, a Policy ID of 12 bits, and a 12-bit Reserved field. This protocol structure specifically fits within the 32-bit Linux firewall mark. Shifting to options-based encoding lifts this restriction, expanding it to a maximum length of 40 bytes, including the options overhead.

Figure 26N:
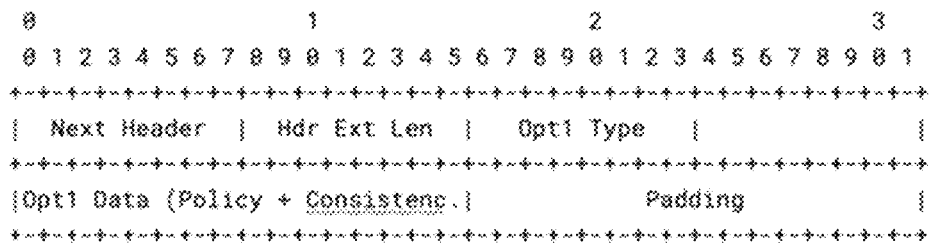
FIG. 26N illustrates an encoding scheme.

When encoding policy marks or any other TLVs into IP options, one should be mindful of slight encoding differences between IPv4 options and IPv6 Extension Headers, as described above. If measures are taken to shrink down the encoding of a given policy into IPv4 options, it would be possible to fit data within the first 32-bit word of IPV4 options, incurring only 4 octets of overhead to encode the data. Note that the combined Policy ID and Consistency ID would amount to 20 bits of data, and would be expanded to 24 bits to align to an octet boundary as shown in FIG. 26M. However, that can be at the cost of dropping the 12-bit Reserved field and dropping the Option length octet and filling it with custom (to surrogate browsing system 702) data instead (breaking the IPv4 protocol specification). Additionally, even in that case, IPv6 encoding into Extension Headers still carries a minimum overhead of 8 octets regardless, as shown in FIG. 26N.

Figure 26O:
FIG. 26O illustrates an encoding scheme.

In some embodiments, the policy ID consumes the remaining 12-bit Reserved field, expanding both fields to 16-bits each, as shown in FIG. 26O. This expands the policy ID from 4,096 ($2^{12}$) possible policies to 65,536 ($2^{16}$) possible policies. The resulting IPv4 options header and IPV6 Extension Header are both 8 octets in length, with the IPV6 Extension Header data aligning to the header boundary and the IPv4 header containing 2 octets of padding.

Figure 26P:
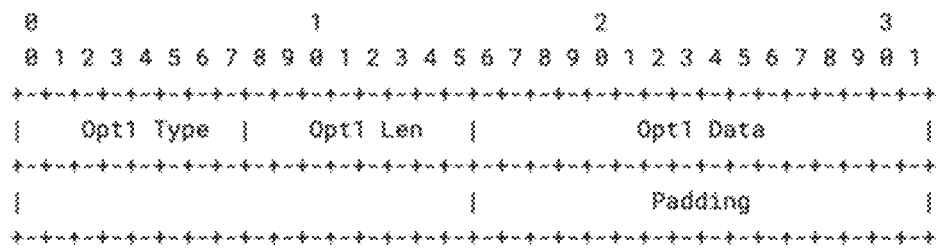
FIG. 26P illustrates an encoding scheme.

IPv4 encoding is shown in FIG. 26P. Both the IPV4 and IPV6 RFCs (RFC791 and RFC8200. respectively) use the 5 lowest order bits in their Option Type fields to indicate the Option Number, with discrete Option Number registries for the two protocols both maintained by IANA. They do, however, assign different semantics to the highest order bits in their Option Type octets.

IPv4 Options

Figure 26Q:
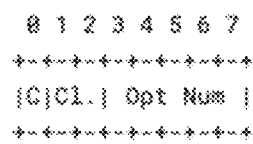
FIG. 26Q illustrates an IPv4 Option Type octet.

The IPv4 Option Type octet is broken down as shown in FIG. 26Q. The first octet includes the copy bit, option class, and option number, which combined form the "Option Type" octet. The copy bit indicates whether or not the option is copied into all fragments, on fragmentation. The option classes are as follows:
  0: control
  1: reserved for future use
  2: debugging and measurement
  3: reserved for future use Two example options for selecting option numbers include:
  1. Use an existing Option Class, e.g., 0/control, and then select an unused option number, or an option number allocated for experimentation (option number 30 is assigned for this purpose).
  2. Use one or both of the future use option classes (classes 1 and 3), and then have free reign to use all option numbers within that option class.

IPv6 Options

In IPv6 options in the Hop-by-hop Options or Destination Options Extension headers, the 3rd highest order bit indicates whether the data could change en route:
  0—Option Data does not change en route.
  1—Option Data may change enroute.

While it is unexpected that data would change en route, options would be contained within the Recast Edge network (of surrogate browsing system 702) and an election can be made to ignore these bits if needed and update options data if/as necessary regardless of the setting in this bit.

The two highest order bits indicate the behavior of the processing node in the event that it does not recognize the Option Type. From RFC8200:
  00—skip over this option and continue processing the header.
  01—discard the packet.
  10—discard the packet and, regardless of whether or not the packet's Destination Address was a multicast address, send an ICMP Parameter Problem, Code 2, message to the packet's Source Address, pointing to the unrecognized Option Type.
  11—discard the packet and, only if the packet's Destination Address was not a multicast address, send an ICMP Parameter Problem, Code 2, message to the packet's Source Address, pointing to the unrecognized Option Type.

As policy data is carried in IP options, parsing options data in the policy marker option is required in order to be able to process traffic and forward it through the Recast Edge network (of surrogate browsing system 702) to the public Internet. In some embodiments, one could opt to still provide "fallback" or "best effort" behavior where policy data cannot be extracted from encoded options.

Silently discarding a packet in the Recast Edge network (of surrogate browsing system 702) provides no feedback to the client application that a request could not be processed in some embodiments. If so, this could result in suboptimal user experience as the client application would need to wait for a request to timeout on this type of failure. An alternate approach is for failed options processing to result in error feedback to the client application, such as a TCP reset or ICMP parameter problem message.

E. Example Process

Figure 29:
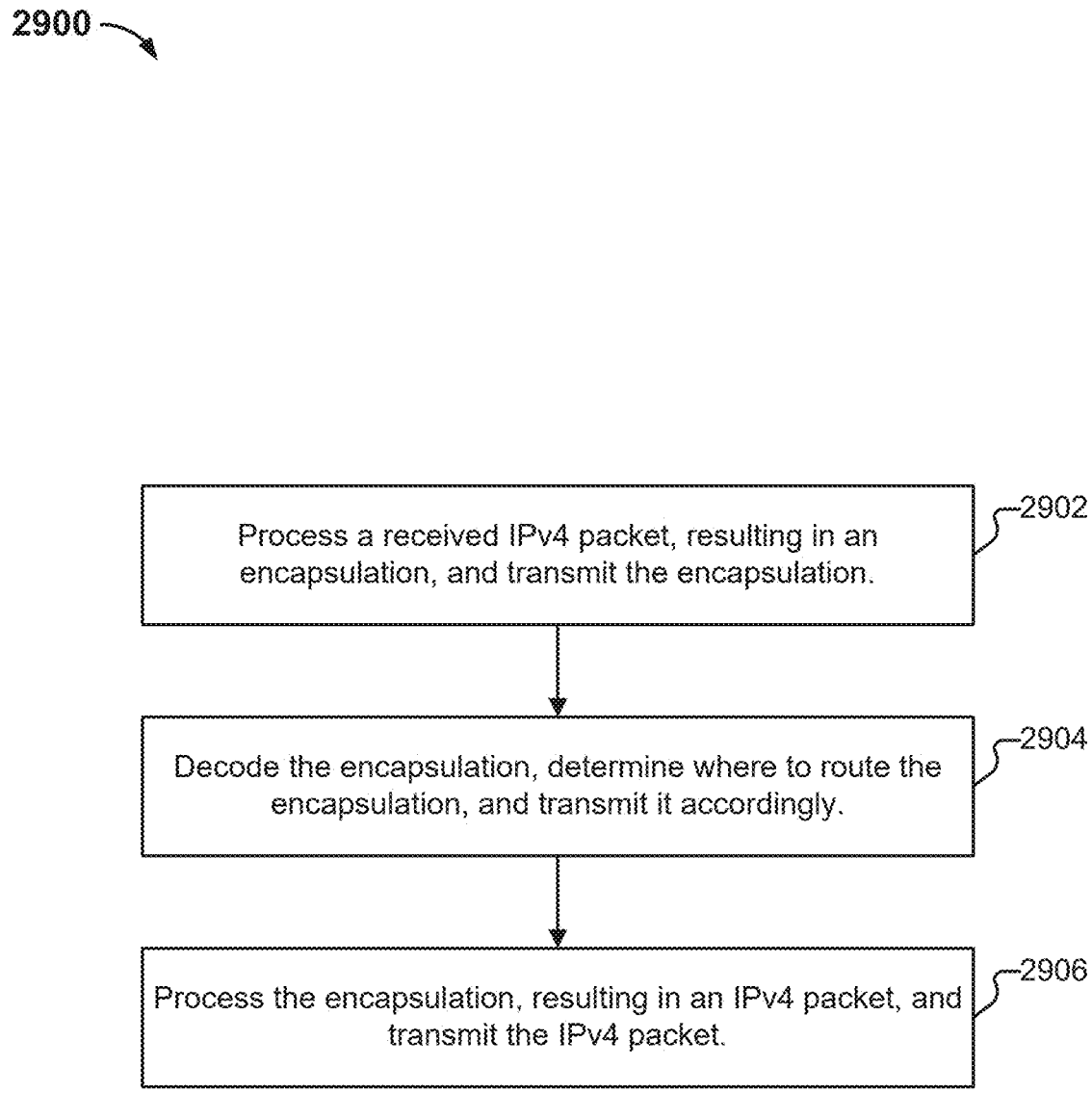
FIG. 29 illustrates an example of a process for providing edge networks for surrogate browsing.

FIG. 29 illustrates an example of a process for providing edge networks for use in surrogate browsing. Process 2900 is performed by embodiments of surrogate browsing system 702, whether wholly or in cooperation with one or more external components (e.g., under the control of an operator of surrogate browsing system 702). In an example implementation, server 2502, server 2504, and server 2506 cooperate to collectively perform process 2900. In various embodiments, process 2900 is initiated in response to receipt (e.g., from client 704) of an IPv4 packet by surrogate browsing system 702, which in turn determines that edge network services should be provided.

The process begins at 2902 when a first server (e.g., server 2502) receives an IPV4 packet and performs various processing on it. As explained above, the processing first includes inserting data into an IPV4 field (e.g., inserting information into the IPv4 Options field), thus augmenting the packet. The augmented IPv4 packet is then translated by server 2502 into an IPv6 packet, preserving the data that was previously inserted (e.g., by including it in the IPV6 Hop-by-hop Extension header). Next, the IPV6 packet is encapsulated (e.g., using Geneve), and then transmitted to a second server (e.g., server 2504).

At 2904, the second server receives the encapsulated IPV6 packet (e.g., server 2504 receives the packet from server 2502) and determines a third server to which the encapsulation should be sent. As an example, the second server decodes the packet, examines the IPV6 Hop-by-hop Extension header (e.g., for the policy identifier), and determines an edge router that satisfies any applicable policies associated with the packet (e.g., selecting router 2506 in Germany over router 2508 in France based on the policy identifier). The second server then transmits the encapsulation to a third server (e.g., server 2506). As explained above, in some embodiments, the second server further encapsulates the encapsulation using Wireguard in conjunction with the transmitting to the third server.

Finally, at 2906, the third server receives the encapsulated IPv6 packet (e.g., server 2506 receives the packet from server 2504). The third server then reverses processing performed at 2902 by the first server. For example, the third server de-encapsulates the packet to form an IPV6 packet, translates it into an IPv4 packet, and strips out the IPV4 options information. As previously mentioned, the original source IP of the packet may have been a private IP address such as 10.0.0.5. The stripped out IPv4 options are used by the third server to select an appropriate public IP address to use as a source address for the IPV4 packet. As mentioned above, the public IP address to be used is selected based on the consistency identifier and policy identifier-providing for session IP stickiness. Once selected, the third server transmits the IPv4 packet accordingly.

As mentioned previously, typically the first and second server will be physically (geographically) close to one another. In contrast, the third server can/will often be located elsewhere (e.g., in a different country). As also mentioned above, embodiments of systems described herein are fault tolerant. In an example scenario, suppose that a data center providing the first edge site (e.g., hosting server 2506) becomes unavailable (e.g., due to a massive network and/or power outage). Another data center (e.g., hosting server 2508) can be selected (e.g., due to being the data center geographically closest to the failed data center), e.g., by server 2504, to provide continuity to any existing sessions. This can be achieved by having the operating edge site take over the IP space of the failed edge site (e.g., using BGP, with Germany being configured as a secondary to the France site). Since geolocation databases update slowly, the original geolocation of the original edge site (e.g., France) will be attributed to the current site (e.g., one located in Germany).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a first server, comprising at least one processor and at least one memory, configured to:
        process a received first IPv4 packet, including by:
            inserting data into an IPV4 field of the first IPv4 packet to form an augmented IPv4 packet;
            translating the augmented IPv4 packet to a first IPv6 packet, wherein the first IPv6 packet includes the inserted data; and
            encapsulating the first IPv6 packet to form an encapsulation; and
        transmit the encapsulation to a second server;
    the second server, configured to:
        receive the encapsulation from the first server; and
        determine a third server to which the encapsulation should be routed and transmit the encapsulation to the third server; and
    the third server, configured to:
        receive the encapsulation from the second server;
        process the encapsulation to form a second IPv6 packet;
        translate the second IPv6 packet to a second IPv4 packet, including by stripping options data; and
        select a public IP address and transmit the second IPv4 packet using the selected public IP address as a source address of the second IPv4 packet.

2. The system of claim 1, wherein the IPV4 field comprises an IPV4 Options field.

3. The system of claim 2, wherein translating the generated IPv4 packet includes translating the data inserted into the IPV4 Options field.

4. The system of claim 1, wherein translating the generated IPv4 packet includes disambiguating the IPv4 packet.

5. The system of claim 1, wherein inserting the data includes inserting a tenant identifier.

6. The system of claim 1, wherein inserting the data includes inserting a consistency identifier.

7. The system of claim 1, wherein inserting the data includes inserting a policy identifier.

8. The system of claim 1, wherein inserting the data includes inserting a policy routing marker.

9. The system of claim 8, wherein the policy routing marker comprises a consistency identifier and a policy identifier.

10. The system of claim 8, wherein a given packet is dropped in the event the given packet is missing the policy routing marker.

11. The system of claim 1, wherein the received first IPv4 packet has an associated policy requirement.

12. The system of claim 11, wherein the policy requirement is determined by the first server.

13. The system of claim 11, wherein the policy requirement includes a geolocation requirement.

14. The system of claim 11, wherein the third server is configured to select the public IP address at least in part by evaluating the policy.

15. The system of claim 1, wherein the third server is configured to select the public IP address at least in part based on the policy routing marker.

16. The system of claim 1, wherein the first server is configured to use Geneve to perform the encapsulation.

17. The system of claim 1, wherein at least one of the servers has an eBPF kernel extension.

18. The system of claim 1, wherein the received first IPv4 packet is part of a web session comprising a first TCP connection and second TCP connection, and wherein the second TCP connection is processed so as to maintain IP stickiness for the session.

19. The system of claim 1, wherein the second server is configured to further encapsulate the encapsulation with Wireguard.

20. The system of claim 1, wherein the second server is configured to provide IP space continuity via a failover datacenter.

21. A method, comprising:
    at a first server:
        processing a received first IPv4 packet, including by:
            inserting data into an IPV4 field of the first IPv4 packet to form an augmented IPv4 packet;

translating the augmented IPv4 packet to a first IPv6 packet, wherein the first IPv6 packet includes the inserted data; and encapsulating the first IPv6 packet to form an encapsulation; and transmit the encapsulation to a second server;

at the second server:

receiving the encapsulation from the first server; and determining a third server to which the encapsulation should be routed and transmit the encapsulation to the third server; and at the third server:

receiving the encapsulation from the second server;

processing the encapsulation to form a second IPv6 packet;

translating the second IPv6 packet to a second IPv4 packet, including by stripping options data; and selecting a public IP address and transmit the second IPv4 packet using the selected public IP address as a source address of the second IPv4 packet.

* * * * *